US009724991B2

(12) United States Patent
Ono et al.

(10) Patent No.: US 9,724,991 B2
(45) Date of Patent: Aug. 8, 2017

(54) HYBRID VEHICLE DRIVING APPARATUS

(71) Applicants: Tomohito Ono, Susono (JP); Takahito Endo, Suntou-gun (JP); Yuji Iwase, Mishima (JP)

(72) Inventors: Tomohito Ono, Susono (JP); Takahito Endo, Suntou-gun (JP); Yuji Iwase, Mishima (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 52 days.

(21) Appl. No.: 14/773,992

(22) PCT Filed: Mar. 22, 2013

(86) PCT No.: PCT/JP2013/058441
§ 371 (c)(1),
(2) Date: Sep. 9, 2015

(87) PCT Pub. No.: WO2014/147843
PCT Pub. Date: Sep. 25, 2014

(65) Prior Publication Data
US 2016/0023651 A1    Jan. 28, 2016

(51) Int. Cl.
*B60W 20/10* (2016.01)
*B60K 6/26* (2007.10)
(Continued)

(52) U.S. Cl.
CPC ............... *B60K 6/26* (2013.01); *B60K 6/365* (2013.01); *B60K 6/387* (2013.01); *B60K 6/445* (2013.01);
(Continued)

(58) Field of Classification Search
CPC .... B60K 2006/266; B60K 6/26; B60K 6/365; B60K 2006/4816; B60K 6/445; B60W 20/108; B60W 20/10
See application file for complete search history.

(56) References Cited

U.S. PATENT DOCUMENTS 5,904,631 A * 5/1999 Morisawa ................ B60K 6/26
475/5
6,808,468 B1 * 10/2004 Miyazaki ............... B60K 6/365
475/1
(Continued)

FOREIGN PATENT DOCUMENTS

JP    2005-297729 A    10/2005
JP    3925462 B2    6/2007
(Continued)

*Primary Examiner* — Stacey Fluhart
(74) *Attorney, Agent, or Firm* — Oliff PLC

(57) ABSTRACT

A hybrid vehicle driving apparatus includes: an engine; a first rotating machine; a second rotating machine; planetary gear mechanisms capable of forming a four-element complex planetary to which the engine, the first rotating machine, the second rotating machine, and drive wheels are connected; and a controller. In a collinear diagram of the complex planetary, the first and second rotating machines are adjacent to each other and disposed on one side with respect to the engine. In a state in which the complex planetary is formed, the controller is configured to operate, in a predetermined mode, the first and second rotating machines at operating points at which a total of absolute values of workloads of the first and second rotating machines is smaller than the total of the absolute values at operating points for achieving an electric power balance between the first and second rotating machines.

10 Claims, 13 Drawing Sheets

AXIAL DIRECTION

(51) Int. Cl.
*B60K 6/365* (2007.10)
*B60K 6/387* (2007.10)
*B60K 6/445* (2007.10)
*B60K 6/48* (2007.10)
*B60W 20/15* (2016.01)
*B60K 6/38* (2007.10)

(52) U.S. Cl.
CPC ............... *B60K 6/48* (2013.01); *B60W 20/15* (2016.01); *B60K 2006/381* (2013.01); *Y02T 10/6221* (2013.01); *Y02T 10/6239* (2013.01); *Y10S 903/906* (2013.01)

(56) References Cited

U.S. PATENT DOCUMENTS

| | | | |
|---|---|---|---|
| 2008/0242463 A1 | 10/2008 | Yamada et al. | |
| 2009/0082151 A1* | 3/2009 | Tabata | B60K 6/26 475/5 |
| 2009/0093330 A1* | 4/2009 | Kumazaki | B60K 6/365 475/5 |
| 2010/0051367 A1 | 3/2010 | Yamada et al. | |
| 2012/0316021 A1* | 12/2012 | Kim | B60K 6/365 475/5 |
| 2013/0116078 A1* | 5/2013 | Hokoi | B60K 6/445 475/5 |
| 2014/0031168 A1* | 1/2014 | Yang | B60K 6/547 477/3 |
| 2014/0194238 A1* | 7/2014 | Ono | B60K 6/445 475/5 |
| 2014/0194239 A1 | 7/2014 | Ono et al. | |

FOREIGN PATENT DOCUMENTS

| | | |
|---|---|---|
| JP | 2008-247271 A | 10/2008 |
| JP | 4264843 B2 | 5/2009 |
| WO | 2013014777 A1 | 1/2013 |
| WO | 2013021501 A1 | 2/2013 |

* cited by examiner

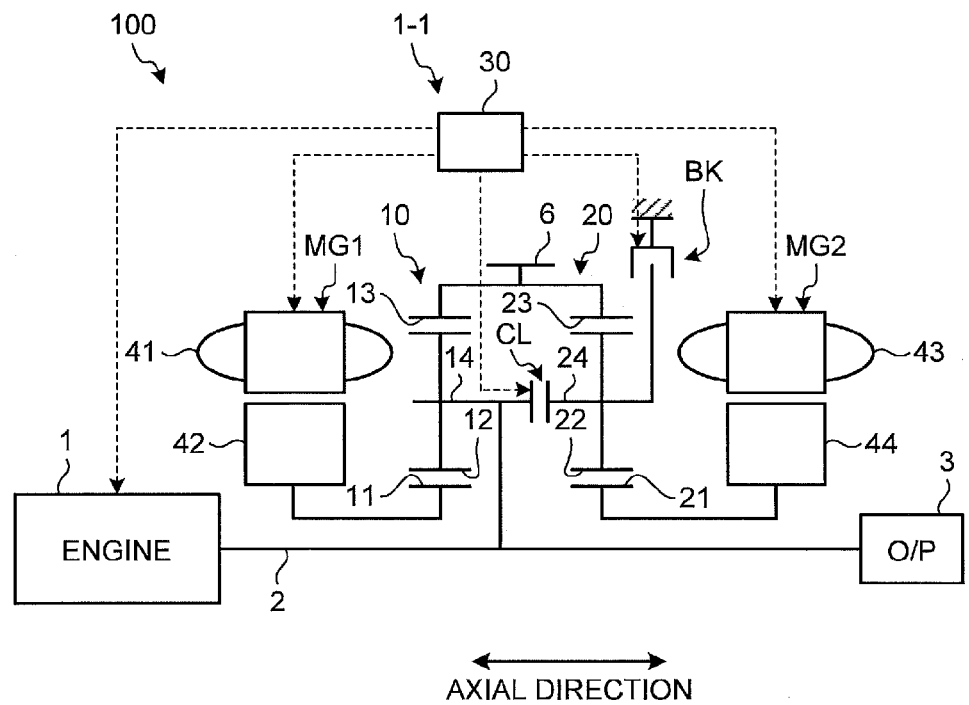

MG1   MG2   ENGINE   OUTPUT

HYBRID VEHICLE DRIVING APPARATUS

FIELD

The present invention relates to a hybrid vehicle driving apparatus.

BACKGROUND

Conventionally, in some cases, rotating machines are controlled taking into account an electric power balance. For example, Patent Literature 1 discloses a technique related to a motive power output apparatus, a control method therefor, and an automobile, in which available electric power Pv that can be supplied to a motor MG2 is set by adding electric power generated by a motor MG1 to a battery output limit, and an engine 22 is started by driving the motor MG2 within the range of the available electric power Pv.

CITATION LIST

Patent Literature

Patent Literature 1: JP 3925462 B1

SUMMARY

Technical Problem

When the rotating machines are controlled so as to achieve an electric power balance, the rotating machines may not be able to be operated at efficient operating points, which may cause a reduction in efficiency.

An object of the present invention is to provide a hybrid vehicle driving apparatus capable of suppressing a reduction in efficiency.

Solution to Problem

A hybrid vehicle driving apparatus according to the present invention includes: an engine; a first rotating machine; a second rotating machine; and a plurality of planetary gear mechanisms capable of forming a four-element complex planetary to which the engine, the first rotating machine, the second rotating machine, and drive wheels are connected, wherein in a collinear diagram of the complex planetary, the first rotating machine and the second rotating machine are adjacent to each other and disposed on one side with respect to the engine, and in a state in which the complex planetary is formed, the hybrid vehicle driving apparatus has a predetermined mode in which the first rotating machine and the second rotating machine are operated at operating points at which a total of absolute values of workloads of the first rotating machine and the second rotating machine is smaller than the total of the absolute values at operating points for achieving an electric power balance between the first rotating machine and the second rotating machine.

In the above-described hybrid vehicle driving apparatus, it is preferable that the predetermined mode is performed at a time at least either one of a rotational speed of the first rotating machine and a rotational speed of the second rotating machine is lower than a predetermined rotational speed.

In the above-described hybrid vehicle driving apparatus, it is preferable that, in the predetermined mode, operating points of the first rotating machine and the second rotating machine are determined, giving priority to an improvement in efficiency of one of the first rotating machine and the second rotating machine that has a lower rotational speed.

In the above-described hybrid vehicle driving apparatus, it is preferable that rotational speeds of the first rotating machine and the second rotating machine are determined in the predetermined mode based on a rotational speed of the engine at which the engine can run with high efficiency.

Advantageous Effects of Invention

A hybrid vehicle driving apparatus according to the present invention includes a plurality of planetary gear mechanisms capable of forming a four-element complex planetary to which an engine, a first rotating machine, a second rotating machine, and drive wheels are connected. In a collinear diagram of the complex planetary, the first rotating machine and the second rotating machine are adjacent to each other and disposed on one side with respect to the engine. In a state in which the complex planetary is formed, the hybrid vehicle driving apparatus has a predetermined mode in which the first rotating machine and the second rotating machine are operated at operating points at which the total of the absolute values of the workloads of the first rotating machine and the second rotating machine is smaller than that for operating points for achieving an electric power balance between the first rotating machine and the second rotating machine. The hybrid vehicle driving apparatus according to the present invention provides an advantageous effect that a reduction in efficiency can be suppressed.

BRIEF DESCRIPTION OF DRAWINGS

FIG. 1 is a skeleton diagram illustrating a main part of a vehicle according to a first embodiment.

FIG. 2 is a diagram illustrating an engagement table for each travel mode of the first embodiment.

DESCRIPTION OF EMBODIMENTS

Figure 3:
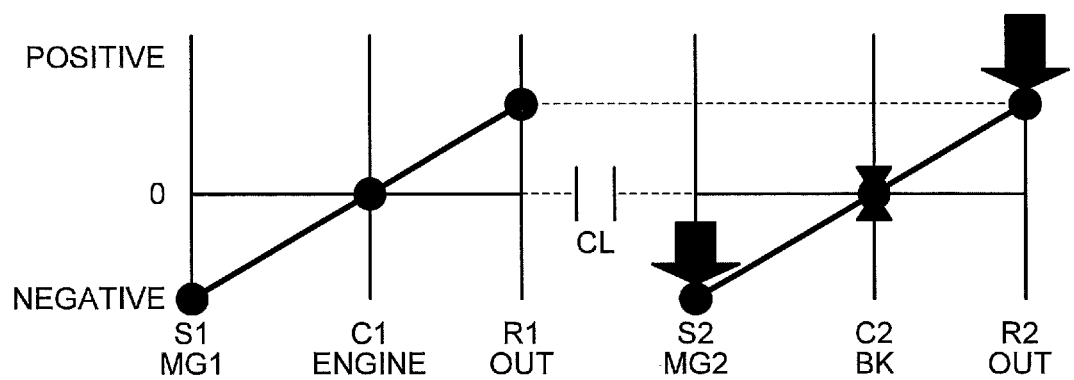
FIG. 3 is a collinear diagram for an EV-1 mode.

Hybrid vehicle driving apparatuses according to embodiments of the present invention will be described in detail below with reference to the drawings. Note that the invention is not limited by the embodiments. Note also that the components of the embodiments described below include those that can be easily assumed by a person skilled in the art or substantially the same ones.

First Embodiment

A first embodiment will be described with reference to FIGS. 1 to 16. The present embodiment relates to a hybrid vehicle driving apparatus. FIG. 1 is a skeleton diagram illustrating a main part of a vehicle according to the first embodiment of the present invention, and FIG. 2 is a diagram illustrating an engagement table for each travel mode of the first embodiment.

As illustrated in FIG. 1, a vehicle 100 is a hybrid (HV) vehicle that has an engine 1, a first rotating machine MG1, and a second rotating machine MG2, as motive power sources. The vehicle 100 may be a plug-in hybrid (PHV) vehicle that can be charged from an external power source. In addition to the above-described motive power sources, the vehicle 100 is configured to include a first planetary gear mechanism 10, a second planetary gear mechanism 20, an ECU 30, a clutch CL, and a brake BK.

In addition, a hybrid vehicle driving apparatus 1-1 according to the present embodiment is configured to include the engine 1, the first rotating machine MG1, the second rotating machine MG2, the first planetary gear mechanism 10, and the second planetary gear mechanism 20. The hybrid vehicle driving apparatus 1-1 may be configured to further include the ECU 30.

The engine 1 converts combustion energy of a fuel into rotary motion of a rotating shaft 2 and outputs the rotary motion. The rotating shaft 2 extends, for example, in a vehicle width direction of the vehicle 100. In the present specification, unless otherwise specified, the "axial direction" indicates the axial direction of the rotating shaft 2. An oil pump 3 is disposed at an end of the rotating shaft 2 that is on the opposite side to the engine side. The oil pump 3 is driven by the rotation of the rotating shaft 2 and thereby discharges lubricating oil. The lubricating oil discharged from the oil pump 3 is supplied to each unit such as the first rotating machine MG1, the second rotating machine MG2, the first planetary gear mechanism 10, and the second planetary gear mechanism 20.

The first rotating machine MG1 and the second rotating machine MG2 each function as a motor (electric motor) and function as a power generator. The first rotating machine MG1 and the second rotating machine MG2 are connected to a battery through an inverter. The first rotating machine MG1 and the second rotating machine MG2 can convert electric power supplied from the battery into mechanical motive power and output the mechanical motive power, and can convert mechanical motive power into electric power by being driven by motive power inputted thereto. The electric power generated by the rotating machines MG1 and MG2 can be stored in the battery. For the first rotating machine MG1 and the second rotating machine MG2, for example, alternating-current synchronous motor generators can be used.

The first rotating machine MG1 has a stator 41 and a rotor 42. The rotor 42 is disposed on the same axis as a first sun gear 11 and connected to the first sun gear 11, and thus rotates integrally with the first sun gear 11. The second rotating machine MG2 has a stator 43 and a rotor 44. The rotor 44 is disposed on the same axis as a second sun gear 21 and connected to the second sun gear 21, and thus rotates integrally with the second sun gear 21.

The first planetary gear mechanism 10 and the second planetary gear mechanism 20 are disposed on the same axis as the rotating shaft 2, and face each other in the axial direction. The first planetary gear mechanism 10 is disposed more on the engine side in the axial direction than the second planetary gear mechanism 20. The first rotating machine MG1 is disposed more on the engine side in the axial direction than the first planetary gear mechanism 10, and the second rotating machine MG2 is disposed more on the opposite side to the engine side in the axial direction than the second planetary gear mechanism 20. On the same axis as the rotating shaft 2 of the engine 1 are disposed the first rotating machine MG1, the first planetary gear mechanism 10, the clutch CL, the second planetary gear mechanism 20, the brake BK, and the second rotating machine MG2 in this order from the side close to the engine 1.

The first planetary gear mechanism 10 is of a single pinion type, and has the first sun gear 11, a first pinion gear 12, a first ring gear 13, and a first carrier 14. The first ring gear 13 is disposed on the same axis as the first sun gear 11 and on the outer side in a diameter direction of the first sun gear 11. The first pinion gear 12 is disposed between the first sun gear 11 and the first ring gear 13, and meshes with each of the first sun gear 11 and the first ring gear 13. The first pinion gear 12 is rotatably supported by the first carrier 14. The first carrier 14 is coupled to the rotating shaft 2 and thus rotates integrally with the rotating shaft 2. Therefore, the first pinion gear 12 can rotate (revolve) about a central axial line of the rotating shaft 2 together with the rotating shaft 2 of the engine 1, and can rotate (self-rotate) about the central axial line of the first pinion gear 12, being supported by the first carrier 14.

The second planetary gear mechanism 20 is of a single pinion type, and has the second sun gear 21, a second pinion gear 22, a second ring gear 23, and a second carrier 24. The second ring gear 23 is disposed on the same axis as the second sun gear 21 and on the outer side in a diameter direction of the second sun gear 21. The second pinion gear 22 is disposed between the second sun gear 21 and the second ring gear 23, and meshes with each of the second sun gear 21 and the second ring gear 23. The second pinion gear 22 is rotatably supported by the second carrier 24. The second carrier 24 is rotatably supported on the same axis as the rotating shaft 2. Therefore, the second pinion gear 22 can rotate (revolve) about the central axial line of the rotating shaft 2 together with the second carrier 24, and can rotate (self-rotate) about the central axial line of the second pinion gear 22, being supported by the second carrier 24.

The second carrier 24 is connected to the first carrier 14 through the clutch CL. The clutch CL disengages the first carrier 14 and the second carrier 24 from each other. The clutch CL is engaged to restrict the relative rotation between the first carrier 14 and the second carrier 24, and can thereby allow the first carrier 14 and the second carrier 24 to rotate integrally with each other. On the other hand, the clutch CL is disengaged to disconnect the first carrier 14 and the second carrier 24 from each other, and can thereby bring the first carrier 14 and the second carrier 24 into a state where they can rotate independently of each other.

The brake BK can restrict the rotation of the second carrier 24. The brake BK restricts the rotation of the second carrier 24 by an engagement element on the second carrier 24 side and an engagement element on the car body side engaging with each other, and can thereby stop the rotation of the second carrier 24. On the other hand, by the brake BK disengaged, the brake BK can allow the rotation of the second carrier 24.

The clutch CL and the brake BK may be, for example, of a dog-tooth engagement type, but are not limited thereto and may be of a friction engagement type, etc. For an actuator that drives the clutch CL and an actuator that drives the brake BK, an actuator using an electromagnetic force or a hydraulic actuator or other publicly known actuators can be used. In the case of the dog-tooth engagement type, the drag loss upon non-engagement is smaller than that of the friction engagement type using a wet type friction material, enabling an increase in efficiency. In addition, when an electromagnetic type is used as a dog-tooth actuator, a hydraulic circuit for the clutch CL and the brake BK becomes unnecessary, enabling the simplification and weight reduction of T/A. Note that when a hydraulic type actuator is adopted, a motor-driven oil pump may be used as a hydraulic source.

The first ring gear 13 and the second ring gear 23 are coupled to each other so that they can rotate integrally with each other. In the present embodiment, the ring gears 13 and 23 each are an internal gear formed on an inner circumferential surface of a cylindrical rotating body, and an output gear 6 is formed on an outer circumferential surface of the rotating body. The output gear 6 is coupled to an output shaft of the hybrid vehicle 100 through a differential mechanism, etc. The output gear 6 is an output unit that outputs motive power which is transmitted from the engine 1 and the rotating machines MG1 and MG2 through the planetary gear mechanisms 10 and 20, to drive wheels. The motive power transmitted to the output gear 6 from the engine 1, the first rotating machine MG1, and the second rotating machine MG2 is transmitted to the drive wheels of the hybrid vehicle 100 through the output shaft. In addition, motive power inputted to the drive wheels from the surface of a road is transmitted to the hybrid vehicle driving apparatus 1-1 from the output gear 6 through the output shaft.

The ECU 30 is an electronic control unit having a computer. The ECU 30 is connected to the engine 1, the first rotating machine MG1, and the second rotating machine MG2, and can control the engine 1 and the rotating machines MG1 and MG2. In addition, the ECU 30 can control the disengagement/engagement of the clutch CL and the brake BK. When a motor-driven oil pump is provided as a hydraulic source for the clutch CL and the brake BK, the ECU 30 can control the motor-driven oil pump.

The hybrid vehicle 100 can selectively perform hybrid travel or EV travel. The hybrid travel is a travel mode in which the hybrid vehicle 100 travels using at least the engine 1 among the engine 1, the first rotating machine MG1, and the second rotating machine MG2, as a motive power source. In the hybrid travel, in addition to the engine 1, at least either one of the first rotating machine MG1 and the second rotating machine MG2 may be further used as a motive power source. Thus, one of the first rotating machine MG1 and the second rotating machine MG2 may be used as a motive power source, and the other may be allowed to function as a reaction force receiver for the engine 1. In addition to that, the first rotating machine MG1 and the second rotating machine MG2 may function as motors or power generators as appropriate according to modes which will be described later, and can also idle in a no load state.

The EV travel is a travel mode in which travel is performed such that the engine 1 is stopped and at least either one of the first rotating machine MG1 and the second rotating machine MG2 is used as a motive power source. Note that, in the EV travel, at least either one of the first rotating machine MG1 and the second rotating machine MG2 may be allowed to generate power, according to the travel conditions, the state of charge of the battery, etc., and at least either one of the first rotating machine MG1 and the second rotating machine MG2 may be allowed to idle.

As illustrated in FIG. 2, the hybrid vehicle driving apparatus 1-1 of the present embodiment can implement five modes, according to the combination of engagement/disengagement of the clutch CL and the brake BK. In FIG. 2, circle symbols in the BK field indicate the engagement of the brake BK. In the case of a blank BK field, it indicates the disengagement of the brake BK. In addition, circle symbols in the CL field indicate the engagement of the clutch CL. In the case of a blank CL field, it indicates the disengagement of the clutch CL.

(EV-1 Mode)

When the brake BK is engaged and the clutch CL is disengaged, mode 1 (travel mode 1) is implemented, enabling travel in mode 1. In the present embodiment, the following EV-1 mode corresponds to mode 1. The EV-1 mode is an EV travel mode in which travel is performed such that the engine 1 is stopped and the second rotating machine MG2 is used as a motive power source. In the EV-1 mode, the same EV travel as that performed by a vehicle having the so-called THS (Toyota Hybrid System) mounted thereon can be performed. FIG. 3 is a collinear diagram for the EV-1 mode. In all collinear diagrams including FIG. 3, S1 indicates the first sun gear 11, C1 indicates the first carrier 14, and R1 indicates the first ring gear 13, and S2 indicates the second sun gear 21, C2 indicates the second carrier 24, and R2 indicates the second ring gear 23. In addition, OUT indicates the output gear 6. The directions of rotation of the first ring gear 13 and the second ring gear 23 for when the hybrid vehicle 100 travels forward are positive directions, and the torque in the direction of rotation in the positive direction (upward arrows in the drawings) is a positive torque.

As illustrated in FIG. 3, in the EV-1 mode, since the clutch CL is disengaged, the first carrier 14 (C1) and the second carrier 24 (C2) can rotate relative to each other, and since the brake BK is engaged, the rotation of the second carrier 24 is restricted. In the second planetary gear mechanism 20, the direction of rotation of the second sun gear 21 and the direction of rotation of the second ring gear 23 are opposite to each other. When the second rotating machine MG2 generates a negative torque and thereby performs negative rotation, the output gear 6 performs positive rotation by the motive power of the second rotating machine MG2. By this, the hybrid vehicle 100 can travel forward. In the first planetary gear mechanism 10, the first carrier 14 is stopped and the first sun gear 11 idles in a negative direction. In the EV-1 mode, when regeneration is not allowed such as when the state of charge of the battery is "fully charged", the second rotating machine MG2 is allowed to idle, by which deceleration can be provided to the hybrid vehicle 100 as a large amount of inertia.

(EV-2 Mode)

Figure 4:
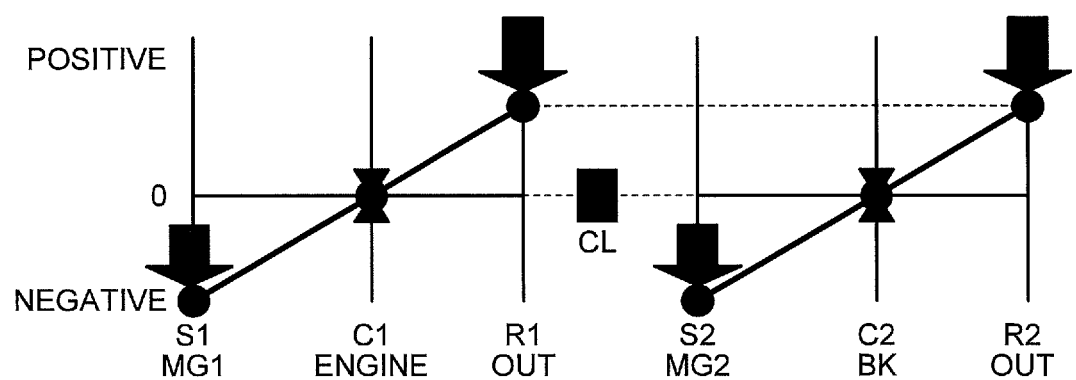
FIG. 4 is a collinear diagram for an EV-2 mode.

When each of the brake BK and the clutch CL is engaged, mode 2 (travel mode 2) is implemented, enabling travel in mode 2. In the present embodiment, the following EV-2 mode corresponds to mode 2. The EV-2 mode is an EV travel mode in which the hybrid vehicle 100 travels such that the engine 1 is stopped and at least either one of the first rotating machine MG1 and the second rotating machine MG2 is used as a motive power source. FIG. 4 is a collinear diagram for the EV-2 mode. In the EV-2 mode, the brake BK is engaged and the clutch CL is engaged, by which each of the rotation of the first carrier 14 and the rotation of the second carrier 24 is restricted. Thus, in the first planetary gear mechanism 10, the direction of rotation of the first sun gear 11 and the direction of rotation of the first ring gear 13 are opposite to each other. The first rotating machine MG1 generates a negative torque and thereby performs negative rotation to allow the output gear 6 to perform positive rotation, enabling to allow the hybrid vehicle 100 to travel forward. In addition, in the second planetary gear mechanism 20, the direction of rotation of the second sun gear 21 and the direction of rotation of the second ring gear 23 are opposite to each other. The second rotating machine MG2 generates a negative torque and thereby performs negative rotation, enabling to allow the hybrid vehicle 100 to travel forward.

In the EV-2 mode, the hybrid vehicle 100 can travel using two rotating machines, the first rotating machine MG1 and the second rotating machine MG2, as motive power sources. In addition, in the EV-2 mode, it is also possible to allow at least either one of the first rotating machine MG1 and the second rotating machine MG2 to generate power as appropriate. It is possible to generate (or regenerate) a torque using one rotating machine or both rotating machines in a shared manner, and thus, it is possible to allow the rotating machines to operate at their respective efficient operating points or possible to relax constrains such as thermal torque limitation. For example, by allowing either one of the rotating machines MG1 and MG2 that can output a torque more efficiently to output (or regenerate) a torque on a priority basis, according to travel speed, an improvement in gas mileage can be achieved. In addition, when thermal torque limitation is imposed on either one of the rotating machines, by assisting by an output (or regeneration) from the other rotating machine, a target torque can be satisfied.

In addition, in the EV-2 mode, it is also possible to allow at least either one of the first rotating machine MG1 and the second rotating machine MG2 to idle. For example, when regeneration is not allowed such as when the state of charge of the battery is "fully charged", the first rotating machine MG1 and the second rotating machine MG2 are allowed to idle simultaneously, by which deceleration can be provided to the hybrid vehicle 100 as a large amount of inertia.

According to the EV-2 mode, it becomes possible to perform EV travel in a wide range of travel conditions or to perform EV travel continuously for a long period of time. Thus, it is suitable for a hybrid vehicle with a high proportion of EV travel, such as a plug-in hybrid vehicle.

(HV-1 Mode)

When the brake BK is engaged and the clutch CL is disengaged, mode 3 (travel mode 3) is implemented, enabling travel in mode 3. In the present embodiment, the following HV-1 mode corresponds to mode 3. In the HV-1 mode, the same hybrid travel as that performed by a vehicle having the THS mounted thereon can be performed.

Figure 5:
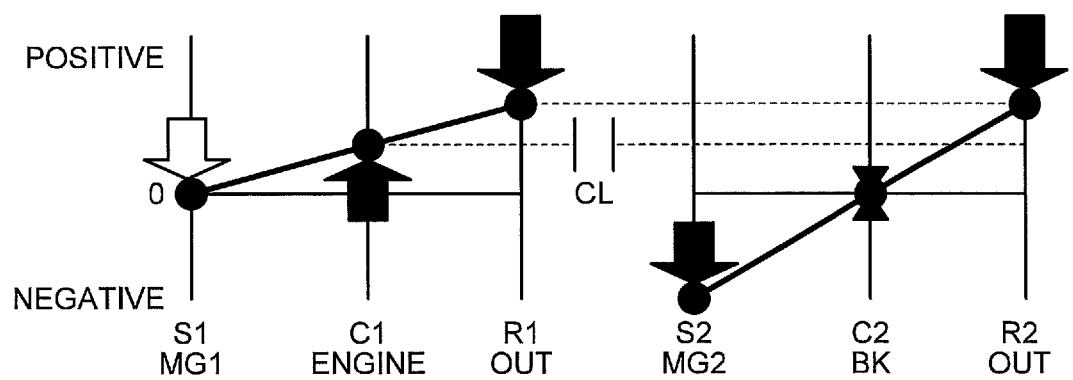
FIG. 5 is a collinear diagram for an EV-1 mode.

FIG. 5 is a collinear diagram for the HV-1 mode. In the HV-1 mode, the engine 1 runs and the output gear 6 is rotated by motive power of the engine 1. In the first planetary gear mechanism 10, the first rotating machine MG1 generates a negative torque to take a reaction force, enabling to transmit motive power from the engine 1 to the output gear 6. In the second planetary gear mechanism 20, the brake BK is engaged and thus the rotation of the second carrier 24 is restricted. Accordingly, the direction of rotation of the second sun gear 21 and the direction of rotation of the second ring gear 23 are opposite to each other. The second rotating machine MG2 generates a negative torque and can thereby generate a driving force in a forward direction for the hybrid vehicle 100.

In the hybrid vehicle driving apparatus 1-1 of the present embodiment, in the collinear diagram, the first ring gear 13 on the output side is located on the overdrive side which is the opposite side with respect to the first rotating machine MG1 that takes a reaction force, with the engine 1 interposed therebetween. Thus, the rotation of the engine 1 is accelerated and transmitted to the output gear 6.

(HV-2 Mode)

Figure 6:
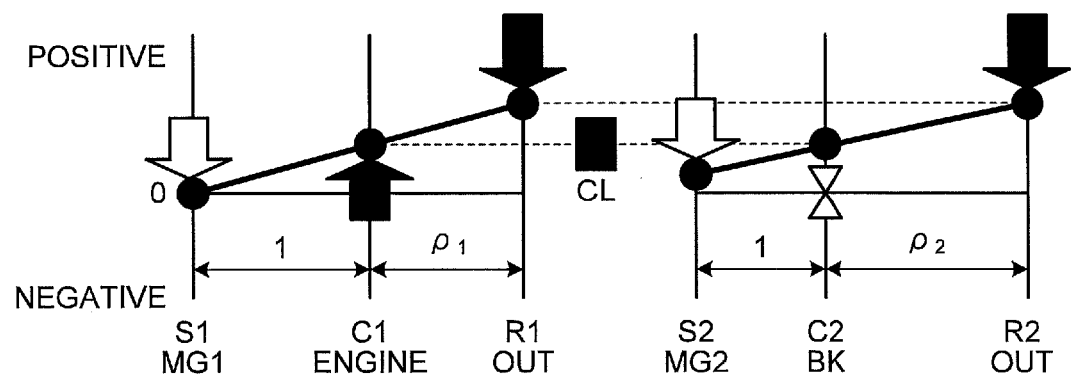
FIG. 6 is a collinear diagram for an EV-2 mode.
Figure 7:
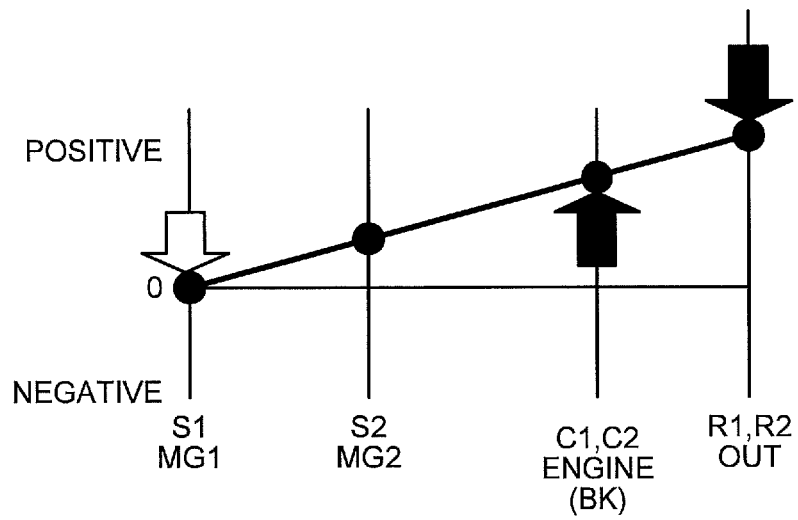
FIG. 7 is a collinear diagram of four elements for the HV-2 mode.
Figure 8:
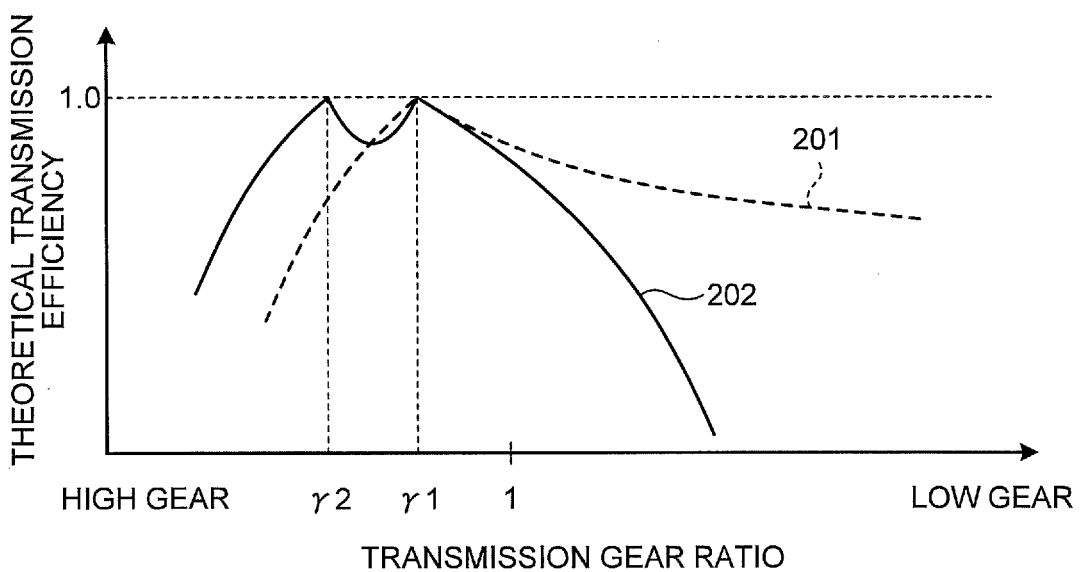
FIG. 8 is a diagram illustrating theoretical transmission efficiency lines according to the first embodiment.

When the brake BK is disengaged and the clutch CL is engaged, mode 4 (travel mode 4) is implemented, enabling travel in mode 4. In the present embodiment, the following HV-2 mode (complex split mode) corresponds to mode 4. The HV-2 mode is a complex split mode in which the first rotating machine MG1, the second rotating machine MG2, the engine 1, and the output gear 6 are linked in this order to a four-element planetary. As will be described below with reference to FIGS. 6 to 8, compared to the HV-1 mode, the HV-2 mode provides a system having mechanical points on the high gear side, and thus has an advantage in that the transmission efficiency upon high gear operation improves. Here, the mechanical points refer to mechanical transmission points and are high-efficiency operating points with "zero" electrical path. FIG. 6 is a collinear diagram for the HV-2 mode, FIG. 7 is a collinear diagram of four elements for the HV-2 mode, and FIG. 8 is a diagram illustrating theoretical transmission efficiency lines according to the first embodiment.

At the HV-2 mode, the first ring gear 13 and the second ring gear 23 operate as one rotating element where they rotate integrally with each other, and the first carrier 14 and the second carrier 24 operate as one rotating element where they rotate integrally with each other. Therefore, by the clutch CL engaged, the first planetary gear mechanism 10 and the second planetary gear mechanism 20 can form, as a whole, a four-element complex planetary.

A collinear diagram of the four-element complex planetary including the first planetary gear mechanism 10 and the second planetary gear mechanism 20 is as illustrated in FIG. 7. In the present embodiment, the order of arrangement in the collinear diagram of the rotating elements of the first planetary gear mechanism 10 and the second planetary gear mechanism 20 is the first sun gear 11, the second sun gear 21, the first carrier 14 and the second carrier 24, and the first ring gear 13 and the second ring gear 23. That is, in the collinear diagram of the four-element complex planetary, the first rotating machine MG1 and the second rotating machine MG2 are adjacent to each other and disposed on one side with respect to the engine 1.

The gear ratio of the first planetary gear mechanism 10 and the gear ratio of the second planetary gear mechanism 20 are determined such that the order of arrangement of the first sun gear 11 and the second sun gear 21 in the collinear diagram becomes the above-described order of arrangement. Specifically, referring to FIG. 6, in each of the planetary gear mechanisms 10 and 20, the gear ratios $\rho_1$ and $\rho_2$ between the carriers 14 and 24 and the ring gears 13 and 23 for when the gear ratios between the sun gears 11 and 21 and the carriers 14 and 24 are 1 are such that the gear ratio $\rho_2$, of the second planetary gear mechanism 20 is larger than the gear ratio $\rho_1$ of the first planetary gear mechanism 10.

In the HV-2 mode, by the clutch CL engaged, the first carrier 14 and the second carrier 24 are coupled to each other. Hence, with respect to motive power outputted from the engine 1, a reaction force can be received by either one of the first rotating machine MG1 and the second rotating machine MG2. It is possible to receive the reaction force of the engine 1 by one or both of the first rotating machine MG1 and the second rotating machine MG2 sharing a torque, and thus, it is possible to allow the rotating machines to operate at efficient operating points or to relax constrains such as thermal torque limitation. Accordingly, an increase in the efficiency of the hybrid vehicle 100 is possible.

For example, by allowing either one of the first rotating machine MG1 and the second rotating machine MG2 that can operate more efficiently to receive a reaction force on a priority basis, an improvement in efficiency can be achieved. As an example, when the engine rotational speed is low at a high vehicle speed, the case is considered in which the rotation of the first rotating machine MG1 becomes negative rotation. In this case, if a reaction force of the engine 1 is received by the first rotating machine MG1, then electric power is consumed, going into a reverse powering state where a negative torque is generated, causing a reduction in efficiency.

Here, as can be seen from FIG. 7, in the hybrid vehicle driving apparatus 1-1 of the present embodiment, the second rotating machine MG2 is less likely to perform negative rotation than the first rotating machine MG1 and thus has more chance of being able to receive a reaction force in a positive rotation state. Hence, by allowing the second rotating machine MG2 to receive a reaction force on a priority basis when the first rotating machine MG1 performs negative rotation, a reduction in efficiency caused by reverse powering is suppressed, enabling to achieve an improvement in gas mileage resulting from an improvement in efficiency.

In addition, when thermal torque limitation is imposed on either one of the rotating machines, by assisting by regeneration (or output) by the other rotating machine, a required reaction force can be satisfied.

As will be described with reference to FIG. 8, in the HV-2 mode, mechanical points are present on the high gear side, and thus, there is an advantage in that the transmission efficiency upon high gear operation improves. In FIG. 8, a horizontal axis represents transmission gear ratio and a vertical axis represents theoretical transmission efficiency. Here, the transmission gear ratio is the ratio (reduction gear ratio) of the rotational speed of the input side to the rotational speed of the output side of the planetary gear mechanisms 10 and 20. For example, the transmission gear ratio indicates the rotational speed of the first carrier 14 with respect to the rotational speed of the ring gears 13 and 23. On the horizontal axis, the left side is the high gear side with a low transmission gear ratio, and the right side is the low gear side with a high transmission gear ratio. The theoretical transmission efficiency reaches its maximum efficiency of 1.0 when all motive power which is inputted to the planetary gear mechanisms 10 and 20 is transmitted to the output gear 6 by mechanical transmission without passing through an electrical path.

In FIG. 8, a dashed line 201 indicates a transmission efficiency line for the HV-1 mode, and a solid line 202 indicates a transmission efficiency line for the HV-2 mode. The transmission efficiency line 201 for the HV-1 mode reaches its maximum efficiency at a transmission gear ratio $\gamma 1$. At the transmission gear ratio $\gamma 1$, the rotational speed of the first rotating machine MG1 (first sun gear 11) is 0 and thus the electrical path resulting from the reception of a reaction force is 0. Accordingly, an operating point is obtained at which motive power can be transmitted to the output gear 6 from the engine 1 or the second rotating machine MG2 only by the mechanical transmission of motive power. The transmission gear ratio $\gamma 1$ is a transmission gear ratio on the overdrive side, i.e., a lower transmission gear ratio than 1. In this specification, the transmission gear ratio $\gamma 1$ is also referred to as the "first mechanical transmission's transmission gear ratio $\gamma 1$". The transmission efficiency for the HV-1 mode slowly decreases as the value of the transmission gear ratio reaches more on the low gear side than the first mechanical transmission's transmission gear ratio $\gamma 1$. In addition, the transmission efficiency for the HV-1 mode significantly decreases as the value of the transmission gear ratio reaches more on the high gear side than the first mechanical transmission's transmission gear ratio $\gamma 1$.

The transmission efficiency line 202 for the HV-2 mode has mechanical points at a transmission gear ratio $\gamma 2$ in addition to the above-described transmission gear ratio $\gamma 1$. This is due to the fact that the gear ratios of the planetary gear mechanisms 10 and 20 are determined such that the first rotating machine MG1 and the second rotating machine MG2 are present in different positions on the horizontal axis in the collinear diagram of the four elements (FIG. 7). In the HV-2 mode, the rotational speed of the first rotating machine MG1 is 0 at the first mechanical transmission's transmission gear ratio $\gamma 1$, and by the first rotating machine MG1 receiving a reaction force in this state, a mechanical point can be achieved. In addition, the rotational speed of the second rotating machine MG2 is 0 at the transmission gear ratio $\gamma 2$, and by the second rotating machine MG2 receiving a reaction force in this state, a mechanical point can be achieved. The transmission gear ratio $\gamma 2$ is also referred to as the "second mechanical transmission's transmission gear ratio $\gamma 2$".

The transmission efficiency for the HV-2 mode decreases more significantly than the transmission efficiency for the HV-1 mode, with an increase in transmission gear ratio in a range more on the low gear side than the first mechanical transmission's transmission gear ratio $\gamma 1$. In addition, the transmission efficiency line 202 for the HV-2 mode is curved to the low-efficiency side in a range of the transmission gear ratio between the first mechanical transmission's transmission gear ratio $\gamma 1$ and the second mechanical transmission's transmission gear ratio $\gamma 2$. In this range, the transmission efficiency for the HV-2 mode is equal to or higher than the transmission efficiency for the HV-1 mode. The transmission efficiency for the HV-2 mode decreases with a decrease in transmission gear ratio in a range more on the high gear side than the second mechanical transmission's transmission gear ratio $\gamma 2$, but is relatively higher than the transmission efficiency for the HV-1 mode.

As such, in the HV-2 mode, in addition to the first mechanical transmission's transmission gear ratio $\gamma 1$, a mechanical point is present at the second mechanical transmission's transmission gear ratio γ2 more on the high gear side than the first mechanical transmission's transmission gear ratio γ1, by which an improvement in transmission efficiency upon high gear operation can be achieved. By this, it is possible to achieve an improvement in gas mileage resulting from the improvement in transmission efficiency upon high-speed travel.

The hybrid vehicle driving apparatus 1-1 of the present embodiment can achieve an improvement in transmission efficiency by switching between the HV-1 mode and the HV-2 mode as appropriate upon hybrid travel. For example, by selecting the HV-1 mode in a range of the transmission gear ratio more on the low gear side than the first mechanical transmission's transmission gear ratio γ1, and selecting the HV-2 mode in a range of the transmission gear ratio more on the high gear side than the first mechanical transmission's transmission gear ratio γ1, the transmission efficiency can be improved in a wide range of the transmission gear ratio from a low gear range to a high gear range.

(HV-3 Mode)

When the clutch CL and the brake BK are disengaged, mode 5 (travel mode 5) is implemented, enabling travel in mode 5. In the present embodiment, the following HV-3 mode corresponds to mode 5. The HV-3 mode is a travel mode in which travel can be performed by the engine 1 and the first rotating machine MG1 with the second rotating machine MG2 disconnected. In the above-described HV-1 mode, by the brake BK engaged, the second rotating machine MG2 rotates at all times in conjunction with the rotation of the second ring gear 23 upon travel. At a high rotational speed, the second rotating machine MG2 cannot output a large torque, and the rotation of the second ring gear 23 is increased in speed and transmitted to the second sun gear 21. Due to this, it is not always desirable to allow the second rotating machine MG2 to rotate at all times at a high vehicle speed, in terms of an improvement in efficiency.

In the HV-3 mode, since the brake BK is disengaged and the clutch CL is also disengaged, the second rotating machine MG2 can be stopped by disconnecting the second rotating machine MG2 from a motive power's transmission path. In the HV-3 mode, by disconnecting the second rotating machine MG2 from the wheels at a high vehicle speed, the drag loss of the second rotating machine MG2 when not in use can be reduced and also a constraint on the maximum vehicle speed due to the maximum allowable rotational speed of the second rotating machine MG2 can be removed.

The hybrid vehicle driving apparatus 1-1 of the present embodiment can selectively implement three modes, the HV-1 mode, the HV-2 mode, and the HV-3 mode, in hybrid travel by a combination of the engagement/disengagement of the clutch CL and the brake BK. For example, while the HV-1 mode may be selected in the range of the highest reduction gear ratio, the HV-3 mode may be selected in the range of the lowest reduction gear ratio and the HV-2 mode may be selected in the range of the intermediate reduction gear ratio. Note that any two of the above-described three HV modes may be selectively implemented. For example, either one of the HV-2 mode and the HV-3 mode may be selected in the case of a low reduction gear ratio, and the HV-1 mode may be selected in the case of a high reduction gear ratio.

Figure 9:
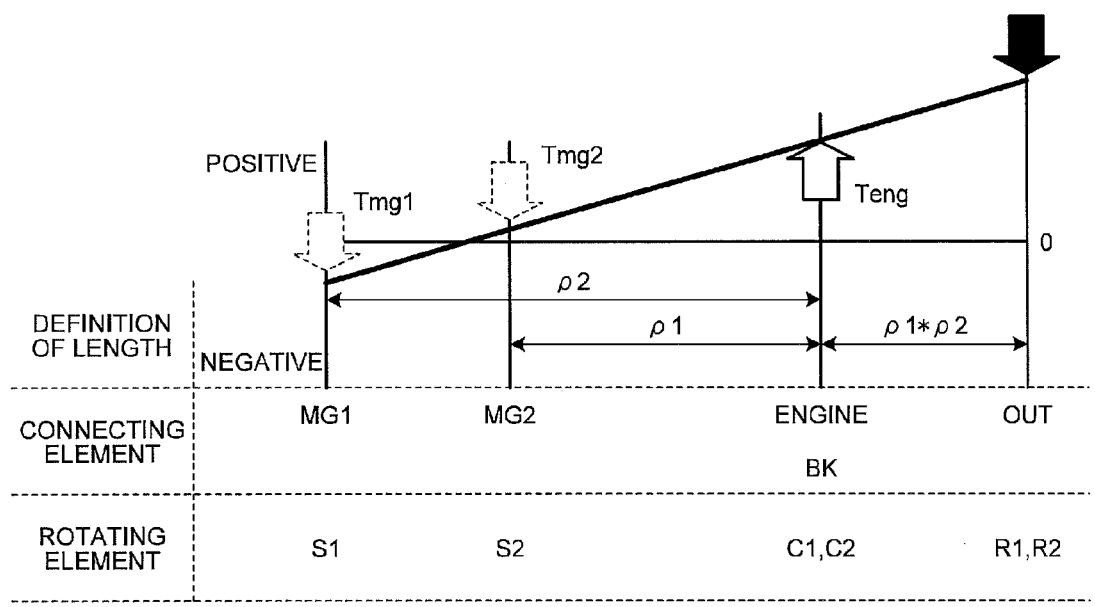
FIG. 9 is an illustrative diagram of a method of determining operating points.

Here, it is desirable that the first rotating machine MG1 and the second rotating machine MG2 be able to be controlled so that the efficiency for the HV-2 mode can be improved. For a method of determining an operating point of the first rotating machine MG1 and an operating point of the second rotating machine MG2, for example, as will be described below with reference to FIG. 9, there is a determination method in which an electric power balance between the first rotating machine MG1 and the second rotating machine MG2 is achieved. FIG. 9 is an illustrative diagram of a method of determining operating points. In the present embodiment, in the case of achieving an electric power balance between the first rotating machine MG1 and the second rotating machine MG2, the operating points of the first rotating machine MG1 and the second rotating machine MG2 are determined by the following steps 1 to 4.

(Step 1)

At step 1, output shaft required power Pout, an output shaft rotational speed Nout, an output shaft torque Tout are determined based on vehicle speed and accelerator pedal position. The output shaft is the output shaft (the ring gears 13 and 23 and the output gear 6) of the complex planetary. The output shaft required power Pout is required power for the output shaft, the output shaft rotational speed Nout is a target rotational speed of the output shaft, and the output shaft torque Tout is a target torque of the output shaft.

(Step 2)

At step 2, engine power Peng is determined. The engine power Peng is a target value of the output power of the engine 1. The ECU 30 determines engine power Peng taking into account losses, based on the required power Pout determined at step 1. The ECU 30 determines engine power Peng taking into account losses in a motive power's transmission path, etc., so that power outputted from the output shaft can be the output shaft required power Pout.

(Step 3)

At step 3, a target operating point of the engine 1 is determined. The target operating point is an operating point made up of a combination of a target engine rotational speed Neng and a target engine torque Teng. The ECU 30 determines a target operating point of the engine 1, based on an engine map indicating a relationship between the operating point of the engine 1 (engine rotational speed and engine torque) and the efficiency of the engine 1. The ECU 30 selects, as a target operating point, one of the operating points for equivalent power to the engine power Peng determined at step 2, at which the engine 1 can run with high efficiency, e.g., an operating point for predetermined optimal gas mileage. An engine rotational speed associated with the selected target operating point is the target engine rotational speed Neng, and an engine torque associated with the selected target operating point is the target engine torque Teng.

(Step 4)

At step 4, target operating points of the first rotating machine MG1 and the second rotating machine MG2 are determined. From the output shaft rotational speed Nout determined at step 1, the target engine rotational speed Neng determined at step 3, and the gear ratios ρ1 and ρ2 of the planetary gear mechanisms 10 and 20, a target MG1 rotational speed Nmg1 is determined by the following equation (1) and a target MG2 rotational speed Nmg2 is determined by the following equation (2):

$$Nmg1 = Nout + (Neng - Nout)/(\rho1 \times \rho2) \times (\rho1 + \rho1 \times \rho2) \quad (1)$$

$$Nmg2 = Nout + (Neng - Nout)/(\rho1 \times \rho2) \times (\rho2 + \rho1 \times \rho2) \quad (2)$$

In addition, from the balance of torque, the following equation (3) holds:

$$Tout + Teng + Tmg1 + Tmg2 = 0 \quad (3)$$

where the target MG1 torque Tmg1 is a target value of the output torque of the first rotating machine MG1, and the target MG2 torque Tmg2 is a target value of the output torque of the second rotating machine MG2.

In addition, by the balance of moment about the engine axis, the following equation (4) holds:

$$\rho 2 \times Tmg1 + \rho 1 \times Tmg2 - \rho 1 \times \rho 2 Tout = 0 \qquad (4)$$

The electric power balance between the first rotating machine MG1 and the second rotating machine MG2 is represented by the following equation (5):

$$Tmg1 \times Nmg1 + Tmg2 \times Nmg2 = 0 \qquad (5)$$

By determining the target MG1 torque Tmg1 and the target MG2 torque Tmg2 so as to satisfy the above-described equation (5), an electric power balance between the first rotating machine MG1 and the second rotating machine MG2 can be achieved. By achieving the electric power balance, the occurrence of losses due to the input and output of electric power from the battery can be reduced. In addition, by achieving the electric power balance, it is possible to establish a hybrid system with a low capacity battery or to extend battery life.

However, when the operating points of the rotating machines MG1 and MG2 are determined so as to achieve the electric power balance, there is a possibility that the rotating machines MG1 and MG2 may be operated at operating points with low efficiency. In the vehicle 100 according to the present embodiment, as illustrated in FIG. 7, etc., in the collinear diagram of the four-element complex planetary, the first rotating machine MG1 and the second rotating machine MG2 are adjacent to each other. By the two rotating machines MG1 and MG2 disposed close to each other, a situation where both of the rotating machines MG1 and MG2 run at a low rotational speed occurs. The fact that both of the rotating machines MG1 and MG2 can run at a low rotational speed is advantageous in terms of a reduction in drag losses and churning losses. On the other hand, when the achievement of the electric power balance is attempted in a low rotational speed range of the rotating machines MG1 and MG2, there is a possibility that the target torque may become a high torque and thus the operating points of the rotating machines MG1 and MG2 may become operating points in a low-efficiency range. In addition, there is a possibility that the target torque may become excessive and thus a four-element travel mode may not be able to be continued, transitioning to other modes such as the HV-1 mode.

On the other hand, in a state in which the four-element complex planetary is formed, the hybrid vehicle driving apparatus 1-1 according to the present embodiment has a predetermined mode in which the rotating machines MG1 and MG2 are operated at operating points at which the total of the absolute values of the workloads of the first rotating machine MG1 and the second rotating machine MG2 is smaller than that for operating points for achieving an electric power balance between the first rotating machine MG1 and the second rotating machine MG2. By this, according to the hybrid vehicle driving apparatus 1-1 according to the present embodiment, losses in the HV-2 mode in which the complex planetary is formed are reduced, enabling to improve efficiency. The operating points of the rotating machines MG1 and MG2 in the predetermined mode are determined, for example, such that the total of the absolute value of the workload of the first rotating machine MG1 and the absolute value of the workload of the second rotating machine MG2 is smallest. By this, the maximization of efficiency in a four-element mode can be achieved.

Figure 10:
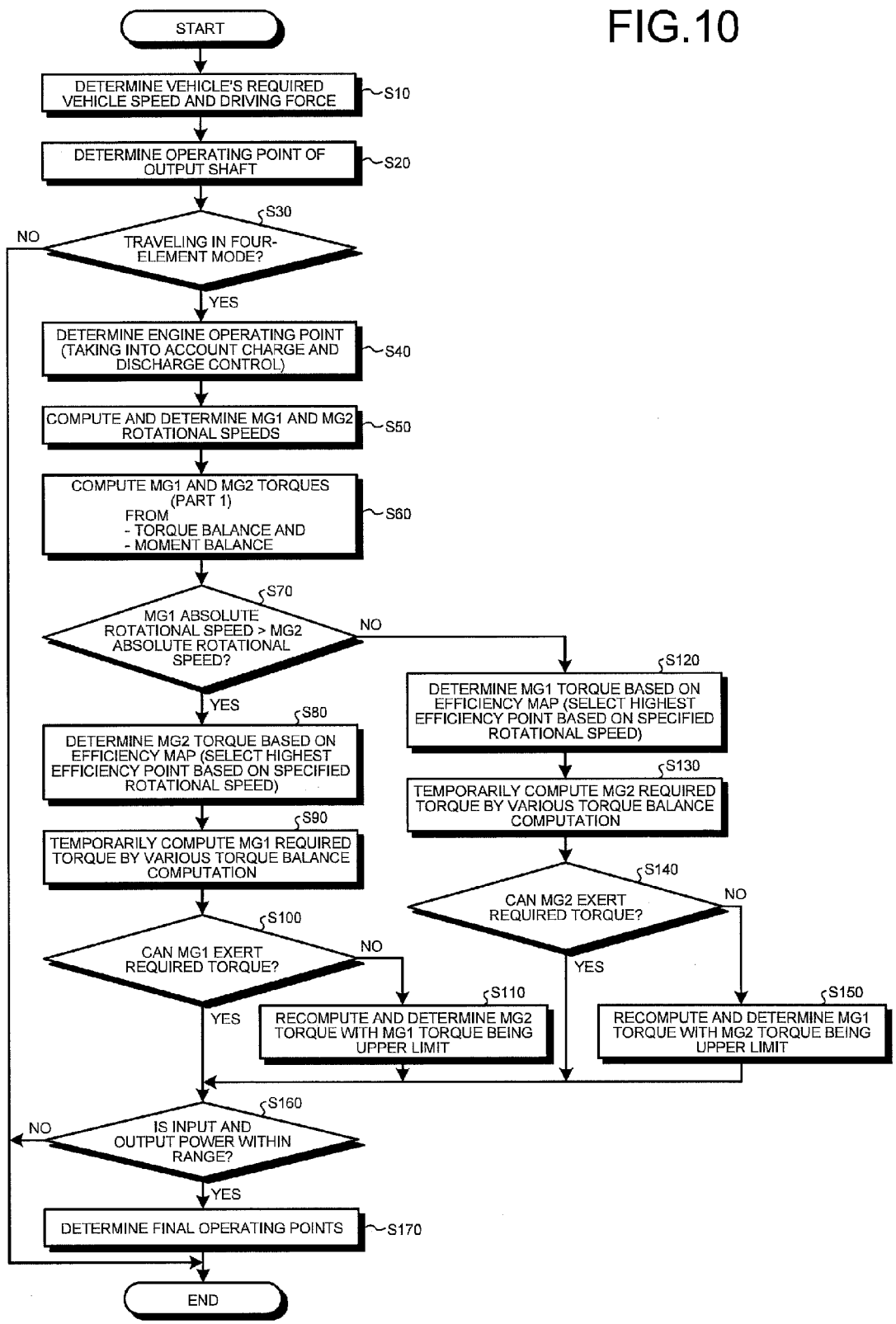
FIG. 10 is a flowchart for control of the first embodiment.

Control of the present embodiment will be described with reference to FIG. 10. FIG. 10 is a flowchart for control of the first embodiment. A control flow illustrated in FIG. 10 is, for example, repeatedly performed at a predetermined interval during travel.

At step S10, the ECU 30 determines a vehicle's required vehicle speed and a driving force. The ECU 30 determines a required vehicle speed and a required driving force for the vehicle 100, for example, based on the current vehicle speed and accelerator pedal position. When step S10 is performed, processing proceeds to step S20.

At step S20, the ECU 30 determines an operating point of the output shaft. The ECU 30 determines an output shaft rotational speed Nout and an output shaft torque Tout, based on the required vehicle speed and the required driving force which are determined at step S10. The ECU 30, for example, calculates required power for the vehicle 100 from the required vehicle speed and the required driving force, and determines an output shaft rotational speed Nout and an output shaft torque Tout from the calculated required power. When step S20 is performed, processing proceeds to step S30.

At step S30, the ECU 30 determines whether the vehicle 100 is traveling in the four-element mode. When the vehicle 100 is traveling in the HV-2 mode, a positive determination is made at step S30. If it is determined as a result of the determination at step S30 that the vehicle 100 is traveling in the four-element mode (step S30—Y), processing proceeds to step S40. If not (step S30—N), the control flow ends.

At step S40, the ECU 30 determines an engine operating point. The ECU 30 determines a target operating point of the engine 1 by a determination method that takes into account charge and discharge control. The ECU 30 determines a target operating point of the engine 1, for example, such that an electric power balance between the first rotating machine MG1 and the second rotating machine MG2 is achieved and thus becomes 0. Typically, the ECU 30 determines a target operating point of the engine 1, for example, as described in the above steps 2 and 3. When step S40 is performed, processing proceeds to step S50.

At step S50, the ECU 30 computes and determines rotational speeds of the first rotating machine MG1 and the second rotating machine MG2. The ECU 30 calculates and determines a target MG1 rotational speed Nmg1 from the above-described equation (1), and calculates and determines a target MG2 rotational speed Nmg2 from the above-described equation (2). When step S50 is performed, processing proceeds to step S60.

At step S60, the ECU 30 computes torques of the first rotating machine MG1 and the second rotating machine MG2. The ECU 30 temporarily calculates an MG1 torque and an MG2 torque from the torque balance equation (the above-described equation (3)) and the moment balance equation (the above-described equation (4)), based on the target operating point of the engine 1 determined at step S40. When the output shaft torque Tout is removed from the above-described equations (3) and (4), the following equation (6) is obtained:

$$Teng = -Tmg1 \times (\rho 1 + 1)/\rho 1 - Tmg2 \times (\rho 2 + 1)/\rho 2 \qquad (6)$$

The target engine torque Teng in the left part is determined at step S40. Therefore, when either one of the target MG1 torque Tmg1 and the target MG2 torque Tmg2 is determined, the other is determined. In the present embodiment, as will be described after step S70, the target torque of one of the first rotating machine MG1 and the second rotating machine MG2 that has a lower target rotational speed is selected first. When step S60 is performed, processing proceeds to step S70.

Figure 11:
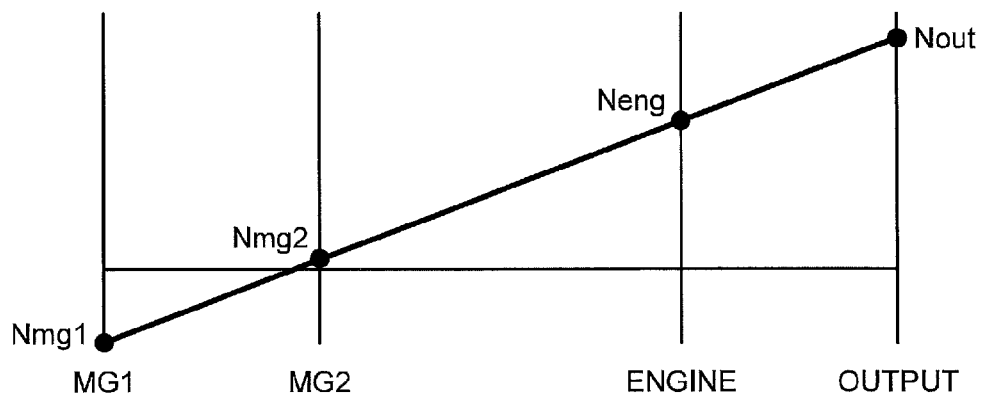
FIG. 11 is a diagram illustrating an example of target rotational speeds.

At step S70, the ECU 30 determines whether the absolute value of the target MG1 rotational speed Nmg1 is larger than the absolute value of the target MG2 rotational speed Nmg2. The ECU 30 makes a determination at step S70 based on the target rotational speeds of the rotating machines MG1 and MG2 which are determined at step S50. FIG. 11 is a diagram illustrating an example of target rotational speeds. As illustrated in FIG. 11, when the absolute value of the target MG1 rotational speed Nmg1 is larger than the absolute value of the target MG2 rotational speed Nmg2, a positive determination is made at step S70. If it is determined as a result of the determination at step S70 that the absolute value of the target MG1 rotational speed Nmg1 is larger than the absolute value of the target MG2 rotational speed Nmg2 (step S70—Y), processing proceeds to step S80. If not (step S70—N), processing proceeds to step S120.

Figure 12:
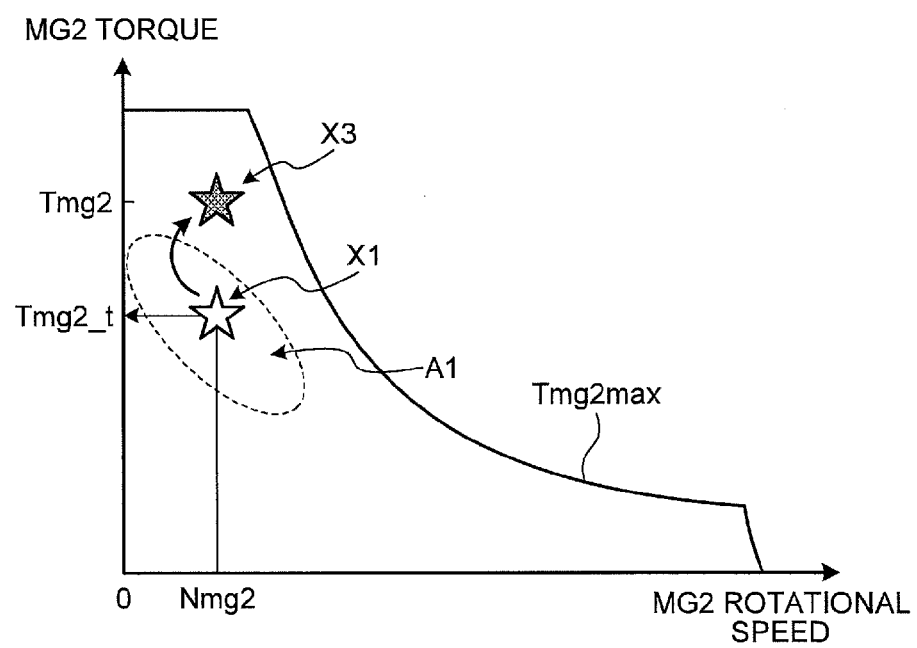
FIG. 12 is an illustrative diagram of a method of determining a target MG2 torque.

At step S80, the ECU 30 determines a target MG2 torque Tmg2. The ECU 30 determines a target MG2 torque Tmg2, for example, based on an efficiency map of the second rotating machine MG2. FIG. 12 is an illustrative diagram of a method of determining the target MG2 torque Tmg2. FIG. 12 illustrates an efficiency map of the second rotating machine MG2. A horizontal axis of the efficiency map represents MG2 rotational speed and a vertical axis represents MG2 torque. In the efficiency map, a maximum torque line Tmg2max is set. The maximum torque line Tmg2max indicates an instructible maximum MG2 torque for each MG2 rotational speed. In addition, a high-efficiency range A1 indicates a torque range where the second rotating machine MG2 can run with high efficiency at each MG2 rotational speed.

The ECU 30 determines an operating point X1 at which the second rotating machine MG2 can run with the highest efficiency, based on the target MG2 rotational speed Nmg2 determined at step S50, and determines a torque associated with the operating point X1, as a temporary target MG2 torque Tmg2_t. When the temporary target MG2 torque Tmg2_t is determined, processing proceeds to step S90.

At step S90, the ECU 30 determines an MG1 required torque Tmg1_r. The ECU 30 assigns the temporary target MG2 torque Tmg2_t determined at step S80, as the target MG2 torque Tmg2 in the above-described equation (6), and determines an obtained target MG1 torque Tmg1 as an MG1 required torque Tmg1_r. When step S90 is performed, processing proceeds to step S100.

Figure 13:
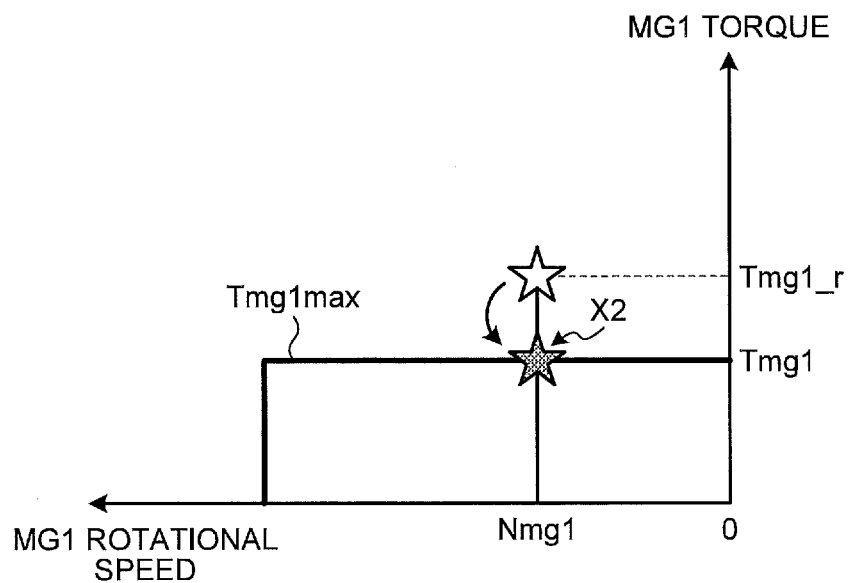
FIG. 13 is an illustrative diagram of a method of determining a target MG1 torque.

At step S100, the ECU 30 determines whether the first rotating machine MG1 can exert the MG1 required torque Tmg1_r. The ECU 30 makes a determination at step S100, for example, based on an efficiency map of the first rotating machine MG1. FIG. 13 is an illustrative diagram of a method of determining the target MG1 torque Tmg1. FIG. 13 illustrates an efficiency map of the first rotating machine MG1. In FIG. 13, a horizontal axis represents MG1 rotational speed and a vertical axis represents MG1 torque. In the efficiency map, a maximum torque line Tmg1max is set. The maximum torque line Tmg1max indicates an instructible maximum MG1 torque for each MG1 rotational speed.

If the MG1 required torque Tmg1_r calculated at step S90 is larger than any of the torques set by the maximum torque line Tmg1max, the ECU 30 makes a negative determination at step S100. If the MG1 required torque Tmg1_r calculated at step S90 is, as illustrated in FIG. 13, in a higher torque range than the maximum torque line Tmg1max with respect to the target MG1 rotational speed Nmg1 determined at step S50, the ECU 30 makes a negative determination at step S100.

On the other hand, if the MG1 required torque Tmg1_r calculated at step S90 is less than or equal to any of the torques in the maximum torque line Tmg1max with respect to the target MG1 rotational speed Nmg1 determined at step S50, a positive determination is made at step S100. When a positive determination is made, a target operating point of the first rotating machine MG1 is temporarily determined by the target MG1 rotational speed Nmg1 and the MG1 required torque Tmg1_r determined at step S90, and a target operating point of the second rotating machine MG2 is temporarily determined by the target MG2 rotational speed Nmg2 and the temporary target MG2 torque Tmg2_t determined at step S80. If it is determined as a result of the determination at step S100 that the first rotating machine MG1 can exert the MG1 required torque Tmg1_r (step S100—Y), processing proceeds to step S160. If not (step S100—N), processing proceeds to step S110.

At step S110, the ECU 30 recomputes and determines an MG2 torque with the MG1 torque being an upper limit. The ECU 30 temporarily determines an operating point X2 illustrated in FIG. 13, as the target operating point of the first rotating machine MG1. The operating point X2 is an operating point associated with the target MG1 rotational speed Nmg1 on the maximum torque line Tmg1max. That is, the ECU 30 determines a selectable upper limit torque for the target MG1 rotational speed Nmg1, as a target MG1 torque Tmg1.

The ECU 30 recomputes an MG2 torque, based on the target MG1 torque Tmg1. In FIG. 12, an operating point X3 is a target operating point of the second rotating machine MG2 associated with the target operating point of the first rotating machine MG1 which is temporarily determined in FIG. 13. That is, the torque at the target operating point X3 is a target MG2 torque Tmg2 which is determined from the target MG1 torque Tmg1 on the maximum torque line Tmg1max of the first rotating machine MG1 and the above-described equation (6). When the target MG2 torque Tmg2 is determined, processing proceeds to step S160.

At step S120, the ECU 30 determines a target MG1 torque Tmg1. The ECU 30 determines a target MG1 torque Tmg1, for example, based on an efficiency map of the first rotating machine MG1. A method of determining the target MG1 torque Tmg1 can be the same as the method of determining the target MG2 torque Tmg2 at step S80. The ECU 30 determines an operating point at which the first rotating machine MG1 can run with the highest efficiency at the target MG1 rotational speed Nmg1, and determines an MG1 torque at the operating point, as a temporary target MG1 torque Tmg1_t. When step S120 is performed, processing proceeds to step S130.

At step S130, the ECU 30 determines an MG2 required torque Tmg2_r. The ECU 30 assigns the temporary target MG1 torque Tmg1_t determined at step S120, as the target MG1 torque Tmg1 in the above-described equation (6), and determines an obtained target MG2 torque Tmg2 as an MG2 required torque Tmg2_r. When step S130 is performed, processing proceeds to step S140.

At step S140, the ECU 30 determines whether the second rotating machine MG2 can exert the MG2 required torque Tmg2_r. The ECU 30 makes a determination at step S140, for example, based on an efficiency map of the second rotating machine MG2. If the MG2 required torque Tmg2_r determined at step S130 is less than or equal to the value of the maximum torque line Tmg2max at the target MG2 rotational speed Nmg2, a positive determination is made at step S140. When a positive determination is made, a target operating point of the first rotating machine MG1 is temporarily determined by the target MG1 rotational speed Nmg1 and the temporary target MG1 torque Tmg1_t determined at step S120, and a target operating point of the second rotating machine MG2 is temporarily determined by the target MG2 rotational speed Nmg2 and the MG2 required torque Tmg2_r calculated at step S130.

If it is determined as a result of the determination at step S140 that the second rotating machine MG2 can exert the MG2 required torque Tmg2_r (step S140—Y), processing proceeds to step S160. If not (step S140—N), processing proceeds to step S150.

At step S150, the ECU 30 recomputes and determines an MG1 torque with the MG2 torque being an upper limit. The ECU 30 determines an instructible maximum MG2 torque for the target MG2 rotational speed Nmg2, as a target MG torque Tmg2 and determines a target MG1 torque Tmg1 from the target MG2 torque Tmg2 and the above-described equation (6). The ECU 30 temporarily determines an operating point that is determined by the target MG1 rotational speed Nmg1 and the target MG1 torque Tmg1 recomputed at step S150, as a target operating point of the first rotating machine MG1, and temporarily determines an operating point that is determined by the target MG2 rotational speed Nmg2 and the target MG2 torque Tmg2 calculated at step S150, as a target operating point of the second rotating machine MG2. When step S150 is performed, processing proceeds to step S160.

At step S160, the ECU 30 determines whether the input and output power is within a predetermined range. The ECU 30 calculates the total value of transmission power [kW] of an electrical system from the target operating point of the first rotating machine MG1 and the target operating point of the second rotating machine MG2 which are determined temporarily. The total of the absolute value of electrical input and output power of the first rotating machine MG1 and the absolute value of electrical input and output power of the second rotating machine MG2 which are determined from the target operating points is determined as the total value of transmission power of the electrical system. A predetermined threshold value is set for the total value of transmission power of the electrical system. The threshold value of transmission power of the electrical system may, for example, change according to vehicle speed. When the total value of transmission power of the electrical system exceeds the threshold value, it is determined that the input and output power is not within the predetermined range, and thus, a negative determination is made at step S160. In this case, control of the rotating machines MG1 and MG2 based on the temporarily determined operating points is not allowed and thus the predetermined mode is not performed.

If it is determined as a result of the determination at step S160 that the input and output power is within the predetermined range (step S160—Y), processing proceeds to step S170. If not (step S160—N), the control flow ends. When a negative determination is made at step S160, the operating points of the rotating machines MG1 and MG2 are determined, for example, such that an electric power balance between the first rotating machine MG1 and the second rotating machine MG2 is achieved.

At step S170, the ECU 30 determines final operating points. The ECU 30 determines the engine operating point determined at step S40, as the final target operating point of the engine 1, and determines the temporarily determined target operating points of the rotating machines MG1 and MG2, as the final target operating points of the rotating machines MG1 and MG2. By this, the predetermined mode is performed, and thus, the first rotating machine MG1 and the second rotating machine MG2 can be operated at operating points at which the total of the absolute values of the workloads of the first rotating machine MG1 and the second rotating machine MG2 is small.

Figure 14:
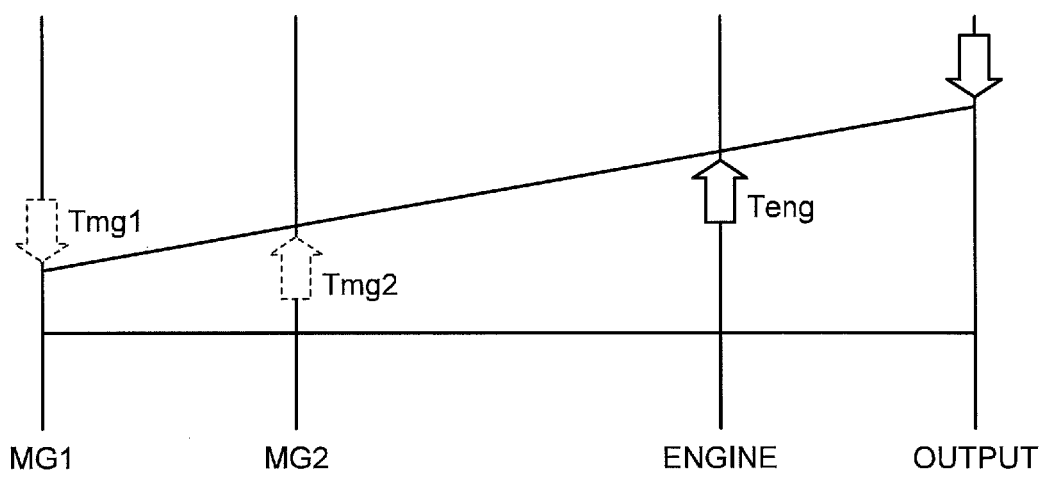
FIG. 14 is a diagram illustrating an example of operating points that are determined so as to achieve an electric power balance between a first rotating machine and a second rotating machine.
Figure 15:
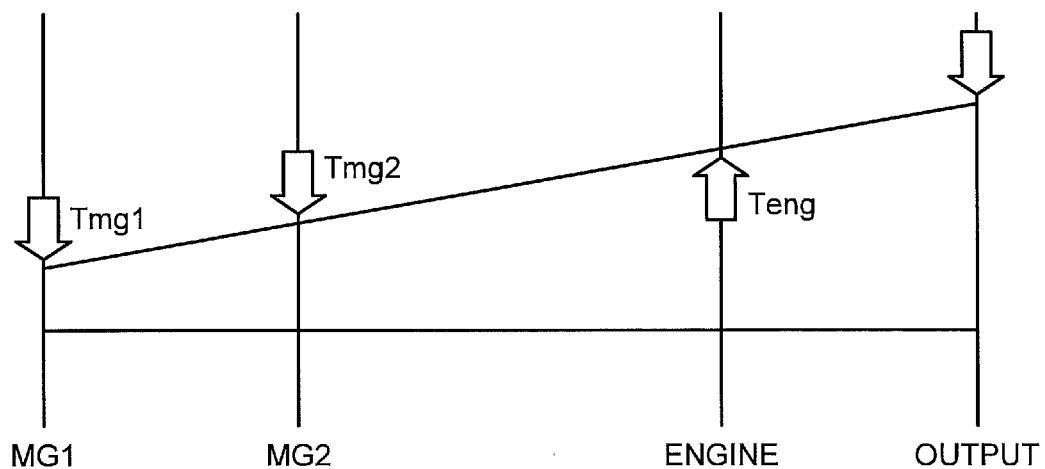
FIG. 15 is a diagram illustrating an example of operating points that are determined in a predetermined mode.

According to the hybrid vehicle driving apparatus 1-1 according to the present embodiment, the efficiency of the four-element mode can be improved, for example, in the following manner. FIG. 14 is a diagram illustrating an example of operating points that are determined so as to achieve an electric power balance between the first rotating machine MG1 and the second rotating machine MG2, and FIG. 15 is a diagram illustrating an example of operating points that are determined in the predetermined mode.

For example, as illustrated in FIG. 14, in the case in which the direction of rotation of the first rotating machine MG1 and the direction of rotation of the second rotating machine MG2 are the same (here, positive rotation), when the achievement of an electric power balance between the first rotating machine MG1 and the second rotating machine MG2 is attempted, one torque needs to be a negative torque and the other torque needs to be a positive torque. Hence, for example, a target MG1 torque Tmg1 and a target MG2 torque Tmg2 are determined such that the first rotating machine MG1 is allowed to output a negative torque to take a reaction force and the second rotating machine MG2 is allowed to output a positive torque to use the torque as a traveling torque.

On the other hand, in the predetermined mode, when the direction of rotation of the first rotating machine MG1 and the direction of rotation of the second rotating machine MG2 are the same, the torques of the two rotating machines MG1 and MG2 having the same direction are allowed. Hence, for example, each of a target MG1 torque Tmg1 and a target MG2 torque Tmg2 is set to be a negative torque to allow the two rotating machines MG1 and MG2 to take a reaction force. By this, the total of the absolute values of the workloads of the first rotating machine MG1 and the second rotating machine MG2 is made smaller than that for the case of achieving an electric power balance between the first rotating machine MG1 and the second rotating machine MG2, enabling to reduce losses.

Note that, when final operating points are determined at step S170, it may be verified whether the total of the absolute values of the workloads of the rotating machines MG1 and MG2 is made smaller by the operating points of the rotating machines MG1 and MG2 determined up to step S160 than the operating points for the case of achieving an electric power balance between the first rotating machine MG1 and the second rotating machine MG2. In this case, it is preferred to determine final operating points when it is verified that the total of the absolute values of the workloads of the rotating machines MG1 and MG2 is made smaller by the predetermined mode.

As described above, according to the hybrid vehicle driving apparatus 1-1 according to the present embodiment, an improvement in efficiency upon use of the four-element mode with high efficiency is possible. In addition, a travel range where the four-element mode can be performed can be extended.

In addition, in the present embodiment, in the predetermined mode, an operating point of one of the first rotating machine MG1 and the second rotating machine MG2 that has a lower rotational speed (a smaller absolute value of rotational speed) is selected so as to operate the rotating machine with high efficiency, and an operating point of the other rotating machine is selected based on the selected operating point. That is, the operating points of the rotating machines MG1 and MG2 are determined, giving priority to an improvement in the efficiency of a rotating machine with a lower rotational speed. By this, there is an advantage in that the total of the absolute values of the workloads of the rotating machines MG1 and MG2 is more easily reduced over the case of achieving an electric power balance between the rotating machines MG1 and MG2.

The control flow illustrated in FIG. 10 may be performed when the transmission power of the electrical system for when the operating points of the rotating machines MG1 and MG2 are determined so as to achieve an electric power balance between the first rotating machine MG1 and the second rotating machine MG2 is greater than predetermined power. The predetermined power is preferably determined in advance, for example, as a threshold value of total power at which the total of the absolute values of the workloads of the first rotating machine MG1 and the second rotating machine MG2 can be reduced by performing the predetermined mode.

Note that, in the present embodiment, whether to perform the predetermined mode may be determined based on the rotational speeds of the rotating machines MG1 and MG2, instead of the input and output power of the rotating machines MG1 and MG2 or in addition to the input and output power. For example, when at least one of an MG1 rotational speed and an MG2 rotational speed is lower than a predetermined rotational speed, the predetermined mode may be performed based on the control flow illustrated in FIG. 10. This is because if the achievement of the electric power balance is attempted when the MG1 rotational speed or the MG2 rotational speed is low, a high torque is likely to be required. Here, the predetermined rotational speed may differ between the MG1 rotational speed and the MG2 rotational speed. Specifically, when at least either one of a condition that the MG1 rotational speed is lower than a first predetermined rotational speed and a condition that the MG2 rotational speed is lower than a second predetermined rotational speed holds, the predetermined mode may be performed.

It is preferred that the predetermined rotational speed be determined based on a boundary of a rotational speed range where an improvement in the efficiency of the four-element mode can be achieved by the predetermined mode. A rotational speed range where the operating points for achieving an electric power balance between the first rotating machine MG1 and the second rotating machine MG2 are operation points with low efficiency (e.g., high torque) can be predetermined based on the efficiency maps of the rotating machines MG1 and MG2 and the gear ratios $\rho 1$ and $\rho 2$ of the planetary gear mechanisms 10 and 20. The predetermined rotational speed is, for example, an upper limit of such a rotational speed range with low-efficiency operating points. By doing so, whether the rotating machines MG1 and MG2 are in a running state where an improvement in efficiency can be achieved by the predetermined mode can be easily determined based on the MG1 rotational speed and the MG2 rotational speed. In addition, the predetermined mode may be performed when the difference or ratio between the MG1 rotational speed and the MG2 rotational speed is large.

Figure 16:
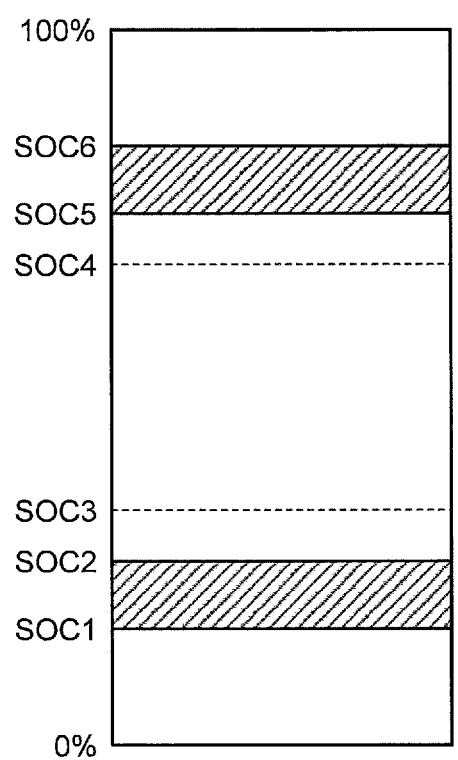
FIG. 16 is an illustrative diagram for determination as to whether to perform the predetermined mode, based on the state of charge.

In addition, whether to perform the predetermined mode may be determined based on a state of charge SOC of the battery, instead of the input and output power of the rotating machines MG1 and MG2 or the rotational speeds of the rotating machines MG1 and MG2 or in addition to the input and output power or the rotational speeds of the rotating machines MG1 and MG2. The state of charge SOC is represented by, for example, percentage. FIG. 16 is an illustrative diagram for determination as to whether to perform the predetermined mode, based on the state of charge SOC. A state of charge SOC of 0% indicates a predetermined reference value on the lower limit side in the amount of battery charge, and a state of charge SOC of 100% indicates a predetermined reference value on the upper limit side in the amount of battery charge. A lower limit value SOC1 is a lower limit value allowed in charge and discharge control, and an upper limit value SOC6 is an upper limit value allowed in charge and discharge control. A lower limit target value SOC2 indicates a lower limit of a target value in charge and discharge control, and an upper limit target value SOC5 indicates an upper limit of a target value in charge and discharge control.

A range between the lower limit value SOC1 and the lower limit target value SOC2 is a forced charge range. In the forced charge range, at least battery discharging is not allowed, and for example, battery charging is forcibly performed. A range between the upper limit value SOC6 and the upper limit target value SOC5 is a forced discharge range. In the forced discharge range, at least battery charging is not allowed, and for example, battery discharging is forcibly performed.

A predetermined mode lower limit value SOC3 is a lower limit value of the state of charge SOC that allows to perform the predetermined mode. The predetermined mode lower limit value SOC3 is a larger value than the lower limit target value SOC2. The predetermined mode lower limit value SOC3 is determined, for example, such that when unintended acceleration is requested while the predetermined mode is performed, the vehicle 100 can respond to the acceleration request without bringing the state of charge SOC to less than or equal to the lower limit target value SOC2. The predetermined mode lower limit value SOC3 is determined, for example, based on the electric power consumption of the rotating machines MG1 and MG2 for when a traveling torque is outputted in response to the acceleration request, or the electric power consumption upon transitioning to the HV-1 mode from the HV-2 mode.

A predetermined mode upper limit value SOC4 is an upper limit value of the state of charge SOC that allows to perform the predetermined mode. The predetermined mode upper limit value SOC4 is a smaller value than the upper limit target value SOC5. The predetermined mode upper limit value SOC4 is determined, for example, such that when hard braking is requested while the predetermined mode is performed, the vehicle 100 can respond to the deceleration request without bringing the state of charge SOC to greater than or equal to the upper limit target value SOC5. The predetermined mode upper limit value SOC4 is determined, for example, based on the amount of power generated by the rotating machines MG1 and MG2 for when a braking torque is generated in response to the deceleration request, or the electric power consumption upon transitioning to the HV-1 mode from the HV-2 mode.

For example, when the current state of charge SOC of the battery is between the predetermined mode lower limit value SOC3 and the predetermined mode upper limit value SOC4, inclusive, the predetermined mode may be performed based on the control flow illustrated in FIG. 10. Examples of each value of the state of charge SOC are as follows: the lower limit value SOC1 may be determined to be 35%, the lower limit target value SOC2 be 40%, the predetermined mode lower limit value SOC3 be 45%, the predetermined mode upper limit value SOC4 be 65%, the upper limit target value SOC5 be 70%, and the upper limit value SOC6 be 75%.

Note that 0% and 100% of the state of charge SOC, the lower limit value SOC1 and the upper limit value SOC6, the lower limit target value SOC2 and the upper limit target value SOC5, and the predetermined mode lower limit value SOC3 and the predetermined mode upper limit value SOC4 may be variable with respect to the entire battery capacity. For example, the 0-100% range (usage range) of the state of charge SOC may be set so as to be variable with respect to the entire battery capacity, according to the mode selection by a driver, etc. In this case, the lower limit values SOC1, SOC2, and SOC3 and the upper limit values SOC4, SOC5, and SOC6 of the state of charge SOC may be determined as appropriate according to the usage range.

In the present embodiment, when the predetermined mode is not performed in a state in which the four-element complex planetary is formed, the first rotating machine MG1 and the second rotating machine MG2 operate at operating points for achieving an electric power balance between the first rotating machine MG1 and the second rotating machine MG2, but the method of determining operating points for when the predetermined mode is not performed is not limited thereto. In a state in which the four-element complex planetary is formed, the hybrid vehicle driving apparatus 1-1 does not need to have a mode in which the first rotating machine MG1 and the second rotating machine MG2 are operated at operating points for achieving an electric power balance between the first rotating machine MG1 and the second rotating machine MG2. Namely, the method of determining the operating points of the rotating machines MG1 and MG2 for when the predetermined mode is not performed in a state in which the four-element complex planetary is formed is any method.

Second Embodiment

Figure 17:
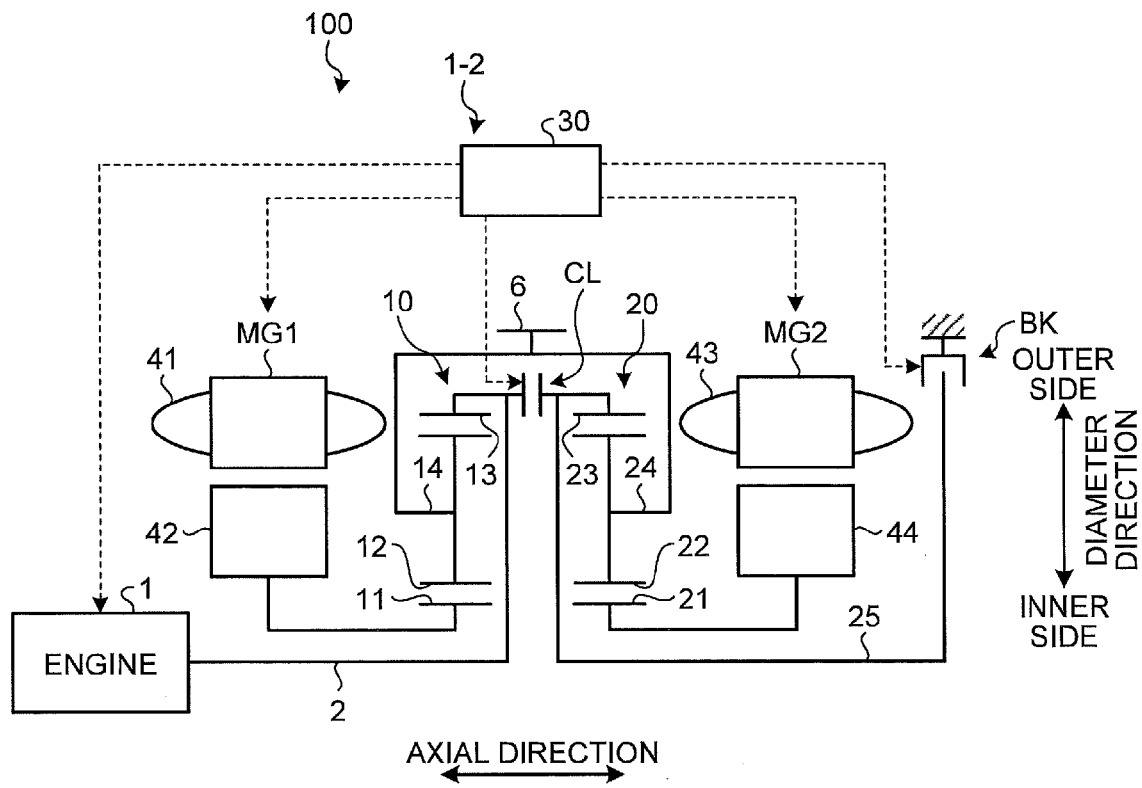
FIG. 17 is a skeleton diagram illustrating a main part of a vehicle according to a second embodiment.
Figure 18:
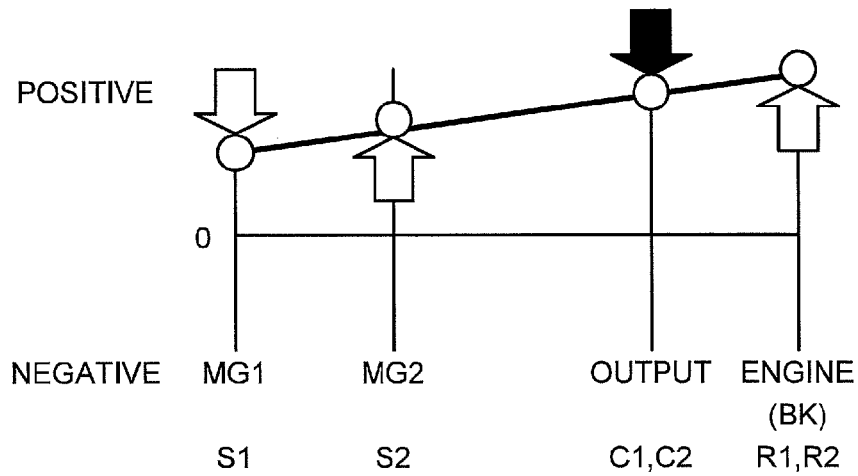
FIG. 18 is a collinear diagram for a four-element mode of the second embodiment.
Figure 19:
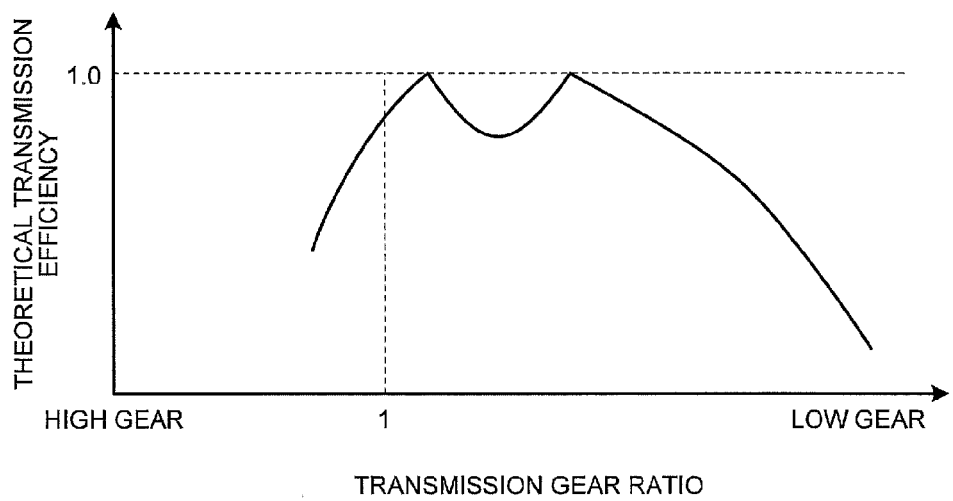
FIG. 19 is a diagram illustrating a theoretical transmission efficiency line according to the second embodiment.

A second embodiment will be described with reference to FIGS. 17 to 19. In the second embodiment, components having the same functions as those described in the above-described first embodiment are denoted by the same reference signs and an overlapping description is omitted. FIG. 17 is a skeleton diagram illustrating a main part of a vehicle according to the second embodiment, FIG. 18 is a collinear diagram for a four-element mode of the second embodiment, and FIG. 19 is a diagram illustrating a theoretical transmission efficiency line according to the second embodiment.

As illustrated in FIG. 17, in a hybrid vehicle driving apparatus 1-2 according to the second embodiment, a first carrier 14 and a second carrier 24 serve as an output shaft. A first sun gear 11 of a first planetary gear mechanism 10 is connected to a rotor 42 of a first rotating machine MG1. The first carrier 14 and the second carrier 24 are connected to each other by a cylindrical member that covers ring gears 13 and 23, and an output gear 6 is disposed on an outer circumferential surface of the cylindrical member. The first ring gear 13 is connected to a rotating shaft 2.

A second sun gear 21 of a second planetary gear mechanism 20 is connected to a rotor 44 of a second rotating machine MG2. The second ring gear 23 is connected to a rotating shaft 25. The rotating shaft 25 is disposed on the inner side in a diameter direction with respect to a shaft of the rotor 44 of the second rotating machine MG2, and is rotatable relative to the shaft of the rotor 44.

A clutch CL disengages the first ring gear 13 and the rotating shaft 2 from the second ring gear 23 and the rotating shaft 25. When the clutch CL is disengaged, the first ring gear 13 and the rotating shaft 2 and the second ring gear 23 and the rotating shaft 25 are rotatable relative to each other. When the clutch CL is fully engaged, the relative rotation between the first ring gear 13 and the rotating shaft 2 and the second ring gear 23 and the rotating shaft 25 is restricted, and thus, the first ring gear 13 and the second ring gear 23 rotate integrally with each other.

A brake BK restricts the rotation of the rotating shaft 25. Namely, the brake BK can restrict the rotation of the second ring gear 23. The brake BK is engaged to restrict the rotation of the second ring gear 23, and is disengaged to allow the rotation of the second ring gear 23.

In the hybrid vehicle driving apparatus 1-2 according to the present embodiment, by the clutch CL engaged, a four-element complex planetary is formed and an HV-2 mode is implemented. As illustrated in FIG. 18, in the hybrid vehicle driving apparatus 1-2 of the second embodiment, in the collinear diagram of the four-element complex planetary, the order of arrangement of the rotating elements is the first sun gear 11, the second sun gear 21, the first carrier 14 and the second carrier 24, and the first ring gear 13 and the second ring gear 23. That is, in the collinear diagram of the four-element complex planetary, the first rotating machine MG1 and the second rotating machine MG2 are adjacent to each other and disposed on one side with respect to an engine 1.

As illustrated in FIG. 19, in the four-element mode, the hybrid vehicle driving apparatus 1-2 according to the second embodiment has two mechanical points more on the low gear side than a transmission gear ratio of 1. Thus, there is an advantage in that the transmission efficiency upon low gear operation improves.

When an electric power balance between the first rotating machine MG1 and the second rotating machine MG2 is achieved in the four-element mode, if, for example, as illustrated in FIG. 18, the direction of rotation of the first rotating machine MG1 and the direction of rotation of the second rotating machine MG2 are the same, an MG1 torque and an MG2 torque are torques in different directions. On the other hand, when a predetermined mode is performed in the four-element mode, the MG1 torque and the MG2 torque having the same direction is allowed. Therefore, for example, each of the MG1 torque and the MG2 torque is set to be a positive torque to allow the two rotating machines MG1 and MG2 to take a reaction force. Thus, the rotating machines MG1 and MG2 can be operated at operating points at which the total of the absolute values of the workloads of the first rotating machine MG1 and the second rotating machine MG2 is smaller than that for operating points for achieving the electric power balance. A method of determining each operating point in the predetermined mode, etc., can be, for example, the same as that described in the above-described first embodiment.

Third Embodiment

Figure 20:
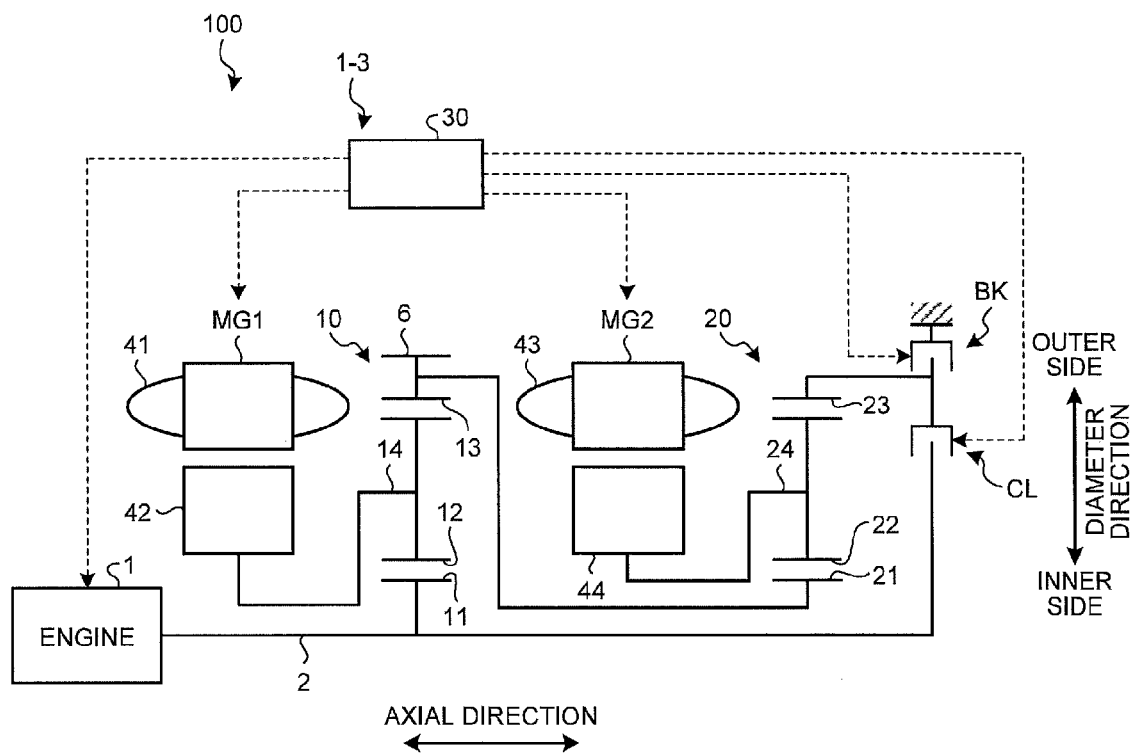
FIG. 20 is a skeleton diagram illustrating a main part of a vehicle according to a third embodiment.
Figure 21:
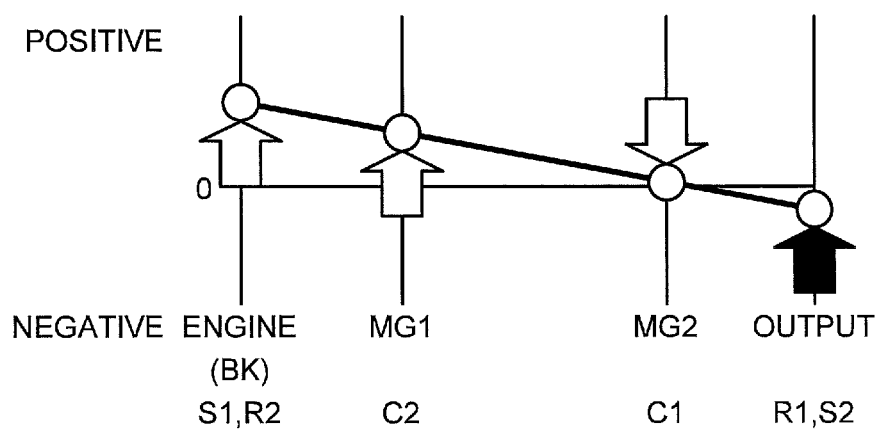
FIG. 21 is a collinear diagram for a four-element mode of the third embodiment.
Figure 22:
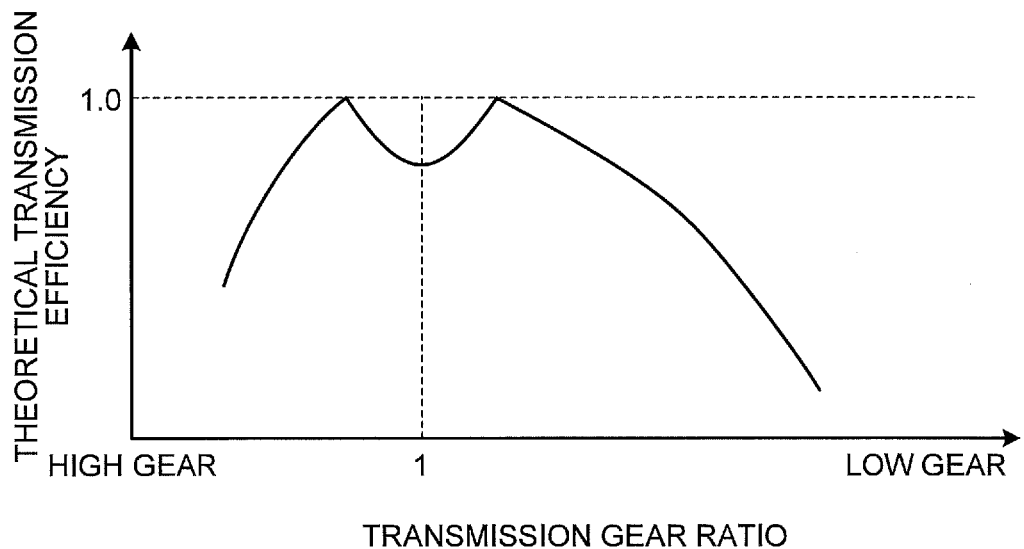
FIG. 22 is a diagram illustrating a theoretical transmission efficiency line according to the third embodiment.

A third embodiment will be described with reference to FIGS. 20 to 22. In the third embodiment, components having the same functions as those described in the above-described embodiments are denoted by the same reference signs and an overlapping description is omitted. FIG. 20 is a skeleton diagram illustrating a main part of a vehicle according to the third embodiment, FIG. 21 is a collinear diagram for a four-element mode of the third embodiment, and FIG. 22 is a diagram illustrating a theoretical transmission efficiency line according to the third embodiment.

As illustrated in FIG. 20, in a hybrid vehicle driving apparatus 1-3 according to the third embodiment, a first ring gear 13 and a second sun gear 21 serve as an output shaft. A first sun gear 11 of a first planetary gear mechanism 10 is connected to an engine 1 through a rotating shaft 2. A first carrier 14 is connected to a rotor 42 of a first rotating machine MG1. The first ring gear 13 is connected to the second sun gear 21 of a second planetary gear mechanism 20 and thus rotates integrally with the second sun gear 21. A second carrier 24 is connected to a rotor 44 of a second rotating machine MG2.

A clutch CL disengages the rotating shaft 2 and a second ring gear 23 from each other. Specifically, the clutch CL disengages the first sun gear 11 and the engine 1 from the second ring gear 23. A brake BK restricts the rotation of the second ring gear 23. An output gear 6 is disposed on the outer circumference side of the first ring gear 13. Note that in a vehicle 100 according to the present embodiment, a counter gear, etc., are interposed between the output gear 6 and drive wheels, and the output gear 6 performs negative rotation when the vehicle 100 travels forward. Therefore, in the hybrid vehicle driving apparatus 1-3 of the present embodiment, a positive-rotation direction is the direction of rotation of the first sun gear 11 for when the engine 1 runs.

In the hybrid vehicle driving apparatus 1-3 according to the present embodiment, by the clutch CL engaged, a four-element complex planetary is formed and an HV-2 mode is implemented. As illustrated in FIG. 21, in the hybrid vehicle driving apparatus 1-3 of the third embodiment, in the collinear diagram of the four-element complex planetary, the order of arrangement of the rotating elements is the first sun gear 11 and the second ring gear 23, the second carrier 24, the first carrier 14, and the first ring gear 13 and the second sun gear 21. That is, in the collinear diagram of the four-element complex planetary, the first rotating machine MG1 and the second rotating machine MG2 are adjacent to each other and disposed on one side with respect to the engine 1.

As illustrated in FIG. 22, in the four-element mode, the hybrid vehicle driving apparatus 1-3 according to the third embodiment has mechanical points, one each is present more on the low gear side and more on the high gear side than a transmission gear ratio of 1. Thus, there is an advantage in that transmission efficiency improves in a good balance on each of the low gear side and the high gear side.

When an electric power balance between the first rotating machine MG1 and the second rotating machine MG2 is achieved in the four-element mode, if, for example, as illustrated in FIG. 21, the direction of rotation of the first rotating machine MG1 and the direction of rotation of the second rotating machine MG2 are the same, an MG1 torque and an MG2 torque are torques in different directions. On the other hand, when a predetermined mode is performed in the four-element mode, each of the MG1 torque and the MG2 torque is set to be a negative torque to allow the two rotating machines MG1 and MG2 to take a reaction force. Thus, the rotating machines MG1 and MG2 can be operated at operating points at which the total of the absolute values of the workloads of the first rotating machine MG1 and the second rotating machine MG2 is smaller than that for operating points for achieving the electric power balance. A method of determining each operating point in the predetermined mode, etc., can be, for example, the same as that described in the above-described first embodiment.

First Variant of the Above-Described Embodiments

Figure 23:
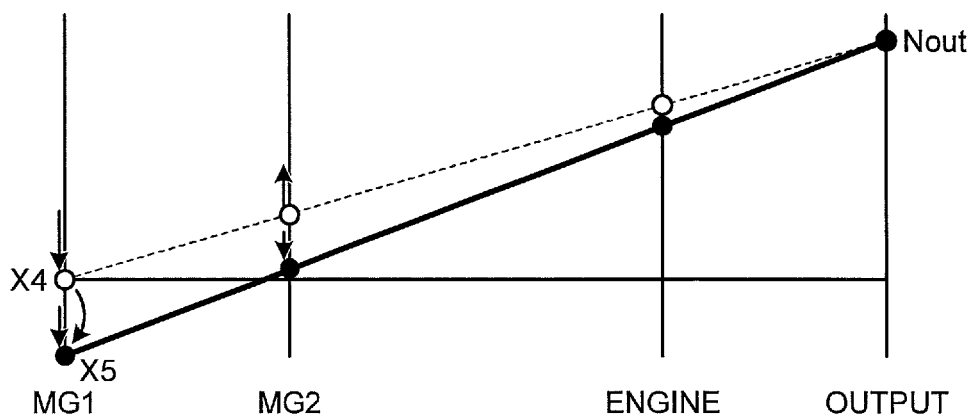
FIG. 23 is a collinear diagram for a first variant of the embodiments.

A first variant of the above-described first to third embodiments will be described. In the above-described embodiments, when the operating points of the rotating machines MG1 and MG2 are adjusted in the predetermined mode, the target MG1 rotational speed Nmg1 and the target MG2 rotational speed Nmg2 are not changed. Instead of this, in the predetermined mode, the operating points of the rotating machines MG1 and MG2 may be adjusted by changing the target MG1 rotational speed Nmg1 and the target MG2 rotational speed Nmg2. FIG. 23 is a collinear diagram for the first variant of the embodiments. FIG. 23 illustrates an example of adjustment of operating points for when the variant is applied to the hybrid vehicle driving apparatus 1-1 of the above-described first embodiment.

In FIG. 23, a dashed line indicates operation points that are determined so as to achieve an electric power balance between the first rotating machine MG1 and the second rotating machine MG2. An operating point X4 of the first rotating machine MG1 which is determined so as to achieve the electric power balance has a low rotational speed. Hence, to achieve the electric power balance, a high torque is required for the first rotating machine MG1. On the other hand, in the predetermined mode, the operating point of the first rotating machine MG1 is changed to an operating point indicated by X5, by which the absolute value of the MG1 rotational speed is increased. With the adjustment of the operating point of the first rotating machine MG1, the operating point of the second rotating machine MG2 and the operating point of the engine 1 are also changed.

In addition, when the electric power balance is achieved, the target MG2 torque Tmg2 is a positive torque, but in the predetermined mode, the target MG2 torque Tmg2 may be a negative torque. Due to the removal of a constraint for achieving the electric power balance, the total of the abolute values of the workloads of the first rotating machine MG1 and the second rotating machine MG2 can be made small. If the efficiency of the entire hybrid vehicle driving apparatus can be improved, then a reduction in engine efficiency can be allowed.

Second Variant of the Above-Described Embodiments

In the above-described first to third embodiments, in the collinear diagram of the four-element complex planetary, the position of the first rotating machine MG1 and the position of the second rotating machine MG2 may be switched. In addition, although in the above-described embodiments, in the collinear diagram of the four-element complex planetary, four connecting elements, i.e., the engine 1, the first rotating machine MG1, the second rotating machine MG2, and the output shaft, are each connected to different rotating elements, the configuration is not limited thereto. For example, the engine 1 and either one of the rotating machines may be connected to the same rotating element. Even in this case, the first rotating machine MG1 and the second rotating machine MG2 are disposed on one side with respect to the engine 1 in the collinear diagram of the four-element complex planetary.

A mode of a differential mechanism that forms the four-element complex planetary is not limited to those exemplified in the above-described first to third embodiments. For example, the four-element complex planetary to which the engine 1, the first rotating machine MG1, the second rotating machine MG2, and the drive wheels are connected may be formed of three or more planetary gear mechanisms.

A method of determining the operating points of the rotating machines MG1 and MG2 in the predetermined mode is not limited to those described in the above-described first to third embodiments. For example, the operating points of the rotating machines MG1 and MG2 at which the total of the absolute values of the workloads of the rotating machines MG1 and MG2 is smallest may be predetermined and stored according to travel conditions, etc. The operating points at which the total of the absolute values of the workloads of the rotating machines MG1 and MG2 is smallest can be obtained in advance by compliance testing, etc.

The contents disclosed in the above-described embodiments and variants can be performed in combination as appropriate.

REFERENCE SIGNS LIST 1-1, 1-2, and 1-3 HYBRID VEHICLE DRIVING APPARATUS
1 ENGINE
2 ROTATING SHAFT
6 OUTPUT GEAR
10 FIRST PLANETARY GEAR MECHANISM
11 FIRST SUN GEAR
12 FIRST PINION GEAR
13 FIRST RING GEAR
14 FIRST CARRIER
20 SECOND PLANETARY GEAR MECHANISM
21 SECOND SUN GEAR
22 SECOND PINION GEAR
23 SECOND RING GEAR
24 SECOND CARRIER
30 ECU
100 VEHICLE
CL CLUTCH
BK BRAKE
MG1 FIRST ROTATING MACHINE
MG2 SECOND ROTATING MACHINE

The invention claimed is:

1. A hybrid vehicle driving apparatus comprising:
an engine;
a first rotating machine;
a second rotating machine;
a plurality of planetary gear mechanisms capable of forming a four-element complex planetary mechanism including four input/output elements to which the engine, the first rotating machine, the second rotating machine, and drive wheels are connected; and
a controller configured to control the first rotating machine and the second rotating machine, wherein
in a collinear diagram representing directions of rotation of respective planetary gear mechanisms within the four-element complex planetary mechanism, the first rotating machine and the second rotating machine are adjacent to each other and disposed on one side with respect to the engine, and
in a state in which the four-element complex planetary mechanism is formed, the controller is configured to operate, in a predetermined mode, the first rotating machine and the second rotating machine at operating points at which a total of absolute values of workloads of the first rotating machine and the second rotating machine is smaller than the total of the absolute values at operating points providing an electric power balance between the first rotating machine and the second rotating machine represented by the following equation (1):

$$Tmg1 \times Nmg1 + Tmg2 \times Nmg2 = 0 \qquad (1)$$

where Tmg1 is a target torque of the first rotating machine, Nmg1 is a target rotational speed of the first rotating machine, Tmg2 is a target torque of the second rotating machine, and Nmg2 is a target rotational speed of the second rotating machine.

2. The hybrid vehicle driving apparatus according to claim 1, wherein the controller is configured to perform the predetermined mode at a time at least either one of a rotational speed of the first rotating machine and a rotational speed of the second rotating machine being lower than a predetermined rotational speed.

3. The hybrid vehicle driving apparatus according to claim 2, wherein the controller is configured to determine, in the predetermined mode, operating points of the first rotating machine and the second rotating machine, giving priority to one of the first rotating machine and the second rotating machine that has a lower rotational speed.

4. The hybrid vehicle driving apparatus according to claim 1, wherein the controller is configured to determine, in the predetermined mode, operating points of the first rotating machine and the second rotating machine, giving priority to one of the first rotating machine and the second rotating machine that has a lower rotational speed.

5. The hybrid vehicle driving apparatus according to claim 1, wherein rotational speeds of the first rotating machine and the second rotating machine are determined in the predetermined mode based on a rotational speed of the engine at which all motive power inputted into the four-element complex planetary mechanism is transmitted via mechanical transmission.

6. A hybrid vehicle driving apparatus comprising:
an engine;
a first rotating machine;
a second rotating machine;
a four-element complex planetary mechanism formed of a plurality of planetary gear mechanisms and including four input/output elements connected to the engine, the first rotating machine, the second rotating machine, and drive wheels;
a memory storing a collinear diagram representing directions of rotation of respective planetary gear mechanisms within the four-element complex planetary mechanism, the first rotating machine and the second rotating machine are adjacent to each other and disposed on one side with respect to the engine; and
an electronic control unit programmed to:
execute a predetermined mode of controlling the first rotating machine and the second rotating machine to rotate at operating points at which a total of absolute values of workloads of the first rotating machine and the second rotating machine is smaller than the total of the absolute values at operating points providing an electric power balance between the first rotating machine and the second rotating machine, the electric power balance being represented by the following equation (1):

$$Tmg1 \times Nmg1 + Tmg2 \times Nmg2 = 0 \qquad (1)$$

where Tmg1 is a target torque of the first rotating machine, Nmg1 is a target rotational speed of the first rotating machine, Tmg2 is a target torque of the second rotating machine, and Nmg2 is a target rotational speed of the second rotating machine.

7. The hybrid vehicle driving apparatus according to claim 6, wherein the electronic control unit executes the predetermined mode at a time at least either one of a rotational speed of the first rotating machine and a rotational speed of the second rotating machine being lower than a predetermined rotational speed.

8. The hybrid vehicle driving apparatus according to claim 7, wherein
the electronic control unit is programmed to:
determine operating points of the first rotating machine and the second rotating machine, giving priority to one of the first rotating machine and the second rotating machine that has a lower rotational speed.

9. The hybrid vehicle driving apparatus according to claim 6, wherein
the electronic control unit is programmed to:
determine operating points of the first rotating machine and the second rotating machine, giving priority to one of the first rotating machine and the second rotating machine that has a lower rotational speed.

10. The hybrid vehicle driving apparatus according to claim 6, wherein
the electronic control unit is programmed to:
determine rotational speeds of the first rotating machine and the second rotating machine based on a rotational speed of the engine at which all motive power inputted into the four-element complex planetary mechanism is transmitted via mechanical transmission.

* * * * *